US007778894B2

(12) United States Patent
Monsor et al.

(10) Patent No.: US 7,778,894 B2
(45) Date of Patent: Aug. 17, 2010

(54) METHOD AND APPARATUS FOR PREPARING TAX INFORMATION IN THE TRUCKING INDUSTRY

(75) Inventors: Michael A. Monsor, Minnetonka, MN (US); Keith P. Morgan, Minnetonka, MN (US); Thomas S. Fansler, Plymouth, MN (US)

(73) Assignee: Intertax, Brentwood, TN (US)

(*) Notice: Subject to any disclaimer, the term of this patent is extended or adjusted under 35 U.S.C. 154(b) by 1208 days.

(21) Appl. No.: 11/077,060

(22) Filed: Mar. 10, 2005

(65) Prior Publication Data

US 2005/0203816 A1 Sep. 15, 2005

Related U.S. Application Data

(60) Provisional application No. 60/551,979, filed on Mar. 10, 2004.

(51) Int. Cl.
*G06F 17/22* (2006.01)
*G07F 19/00* (2006.01)

(52) U.S. Cl. .................... 705/31; 701/1; 701/200; 701/207; 701/208; 701/214; 340/988; 340/993; 340/995.1; 340/995.25; 345/661; 345/676

(58) Field of Classification Search ............ 701/200, 701/207, 208, 214, 1; 340/988, 993, 995.1, 340/995.25; 345/661, 676; 348/14.03; 705/31
See application file for complete search history.

(56) References Cited

U.S. PATENT DOCUMENTS 5,068,656 A * 11/1991 Sutherland .............. 340/989

| | | | | |
|---|---|---|---|---|
| 5,359,528 | A * | 10/1994 | Haendel et al. | 701/35 |
| 5,648,768 | A * | 7/1997 | Bouve | 340/988 |
| 5,694,322 | A * | 12/1997 | Westerlage et al. | 705/417 |
| 5,928,291 | A * | 7/1999 | Jenkins et al. | 701/1 |
| 5,954,773 | A * | 9/1999 | Luper | 701/35 |
| 5,970,481 | A * | 10/1999 | Westerlage et al. | 705/417 |
| 5,974,356 | A * | 10/1999 | Doyle et al. | 701/209 |
| 6,108,591 | A * | 8/2000 | Segal et al. | 701/1 |
| 6,181,995 | B1 * | 1/2001 | Luper et al. | 701/35 |
| 6,253,129 | B1 * | 6/2001 | Jenkins et al. | 701/29 |
| 6,285,953 | B1 * | 9/2001 | Harrison et al. | 701/213 |
| 6,714,857 | B2 * | 3/2004 | Kapolka et al. | 701/123 |
| 6,803,926 | B1 * | 10/2004 | Lamb et al. | 715/744 |
| 6,847,825 | B1 * | 1/2005 | Duvall et al. | 455/456.3 |

* cited by examiner

*Primary Examiner*—Khoi Tran
*Assistant Examiner*—Jaime Figueroa
(74) *Attorney, Agent, or Firm*—Waddey & Patterson; Gary L. Montle; Edward D. Lanquist, Jr.

(57) ABSTRACT

Method and apparatus provide for electronically processing vehicle location data wherein the vehicle location data specifies a sequence of vehicle locations, and wherein the processing determines if the sequence of vehicle locations form a sequence of the vehicle's travel that is acceptable for the purposes of filing tax reports relating to the vehicle. Processing further provides for determining the acceptability of the sequence according to one or more criteria, and provides a user tools that enable the user to accept or revise the vehicle location data for the unacceptable part of the sequence.

37 Claims, 41 Drawing Sheets

| | | | | | | |
|---|---|---|---|---|---|---|
| 1001 | Problem | Mobile Comm | 7,998.8 | 1,528.140 | 5.23 | Uncommitted Gaps |
| 1002 | Problem | Mobile Comm | 8,225.1 | 1,493.670 | 5.51 | Uncommitted Gaps |
| 1003 | Problem | Mobile Comm | 4,653.8 | 651.570 | 7.14 | Uncommitted Gaps |
| 1004 | Problem | Mobile Comm | 10,722.1 | 1,271.840 | 8.43 | MPG out of range |
| 2001 | Problem | Odometer Log | 0.0 | 400.000 | 0.00 | Miles/Fuel incompatible |
| 2002 | Problem | Trip Log | 0.0 | 200.000 | 0.00 | Miles/Fuel incompatible |
| 2003 | Problem | Odometer Log | 0.0 | 300.000 | 0.00 | Miles/Fuel incompatible |

| 3 cash purchases to enter: | Flying J Dandridge, TN  3/26/03 |
| --- | --- |
| | 250 gal, 1.58 unit cost |
| | Flying J Grayson, KY    3/28/03 |
| | 200 gal, 1.58 unit cost |
| | Flying J Georgetown, KY 3/17/03 |
| | 150 gal, 1.58 unit cost |

FIG. 14B

The Trip log indicates 3 missing trip legs;

| Trip # | Date | City | State |
|--------|---------|----------|-------|
| 333 | 3/14/03 | Foley | AL |
| 333 | 3/15/03 | Constance | KY |
| 333 | 3/16/03 | Orlando | FL |

| | | | |
|---|---|---|---|
| Report # TNY<br>Quarter 1, 2003 (Closed) | Road/Mileage Tax for New York Report<br>Getting Started Trucking | | Prepared 08/04/03 15:17:35<br>by Inter-Tax, Inc.<br>Page 1 of 1 |
| Tractor | Total<br>Non-Toll<br>Miles | Mileage<br>Tax | Tax on<br>Miles<br>Driven |
| 1001 | 348 | .0462 | 16.08 |
| | 348 | | 16.08 |

METHOD AND APPARATUS FOR PREPARING TAX INFORMATION IN THE TRUCKING INDUSTRY

This application claims priority under 35 USC 119(e) to U.S. Provisional Application No. 60/551,979, filed Mar. 10, 2004, which is incorporated herein by reference.

TECHNICAL FIELD OF THE INVENTION

The present invention pertains generally to the field of data processing, and more particularly to method, software and apparatus used to process tax-related data in the trucking industry.

BACKGROUND OF THE INVENTION

Most if not all U.S. states levy use taxes on commercial truck traffic based at least in part on miles traveled. Truckers and trucking companies are therefore required to keep careful records of routes and mileage in order to substantiate tax payments and filings. It is known to use an automated position tracking system, such as a global positioning system (GPS) or other suitable-vehicle locating system, to track the vehicle's position automatically. These systems provide an electronic data set that can be used to help determine a truck's route and mileage through any particular state in which it is traveling. In addition, fuel purchase records are also available in electronic form and can also be used to assist in establishing a truck's route and positions at various times. It is also known to use both of these forms of records in combination to establish a truck's route. Further, records kept manually in the truck's log, or dispatcher records that may be available in electronic form, are also used to help establish or validate a truck's route.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIGS. 14A to 14G are examples of screenshots of a user interface according to embodiments of the present invention.

FIGS. 15A to 15E are examples of screenshots of a user interface according to embodiments of the present invention.

FIG. 16 is a screenshot of a user interface according to embodiments of the present invention.

DETAILED DESCRIPTION OF THE INVENTION

In the following detailed description of the embodiments of the inventive subject matter, reference is made to the accompanying drawings that form a part hereof, and in which is shown by way of illustration specific embodiments in which the inventive subject matter may be practiced. These embodiments are described in sufficient detail to enable those skilled in the art to practice the inventive subject matter, and it is to be understood that other embodiments may be utilized and that changes may be made without departing from the scope of the present inventive subject matter. The following detailed description is, therefore, not to be taken in a limiting sense, and the scope of the present inventive subject matter is defined only by the appended claims.

Figure 1:
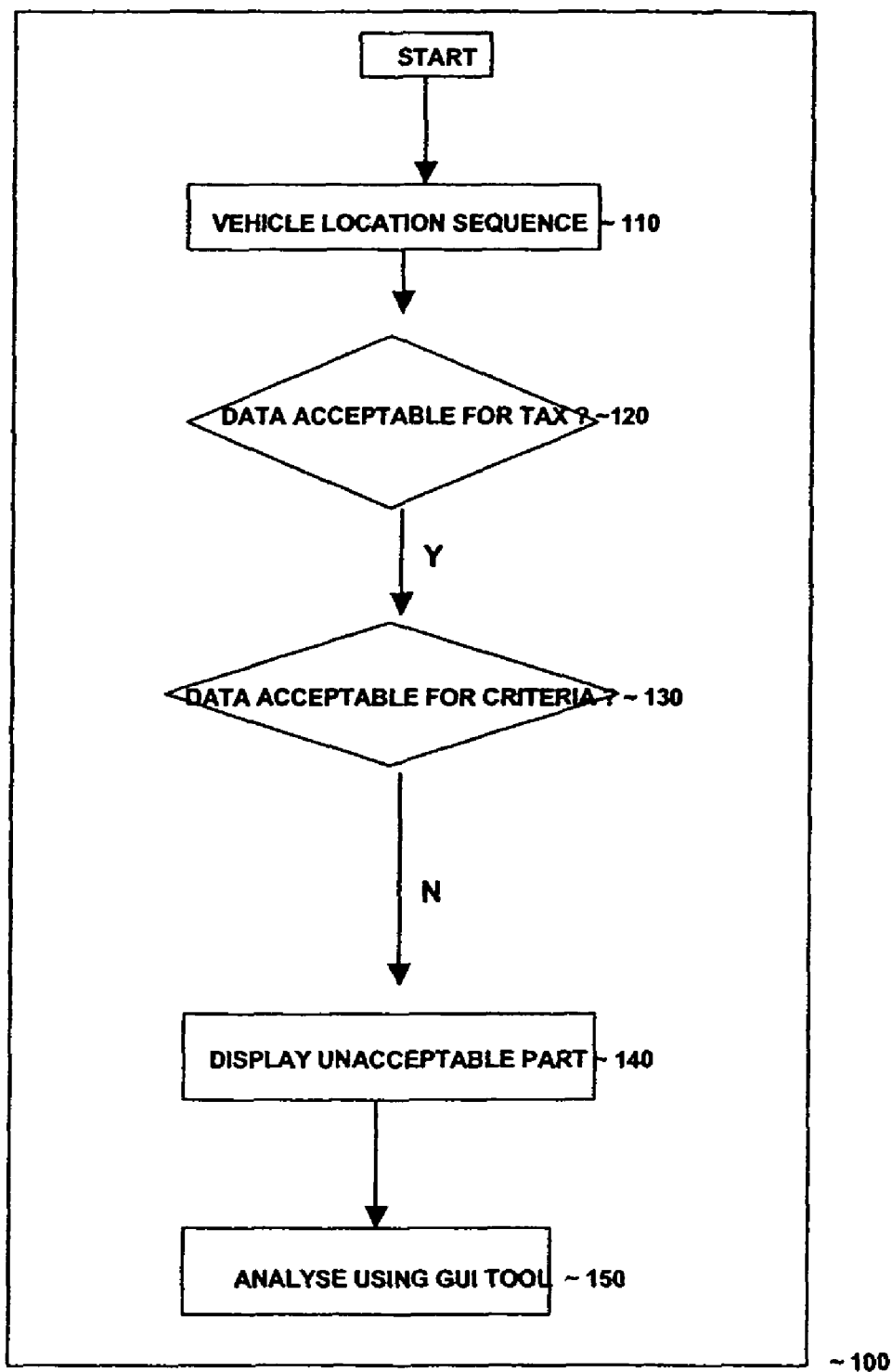
FIG. 1 is an example of a method according to an embodiment of the present invention.
Figure 2:
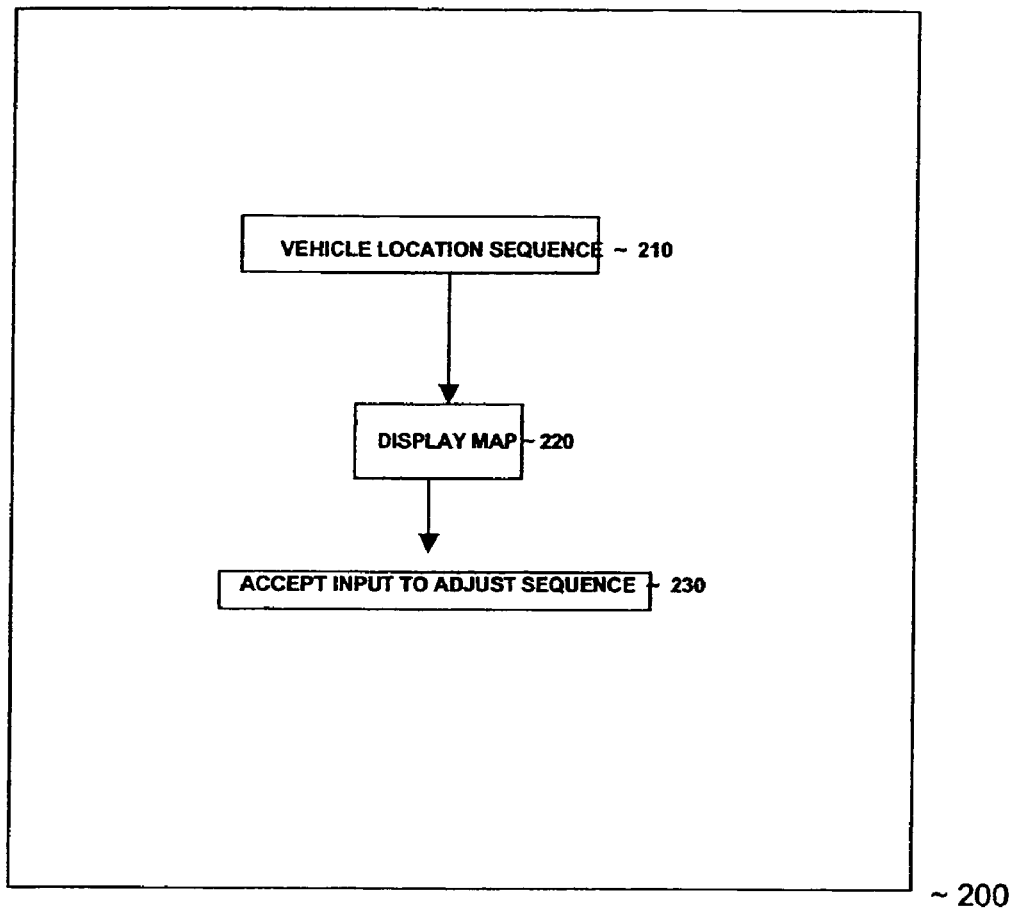
FIG. 2 is an example of a method according to an embodiment of the present invention.

Referring now to FIG. 1 there is illustrated a first embodiment of a method 100 according to the inventive subject matter disclosed herein. Method 100 provides for electronically processing 110 vehicle location data wherein the vehicle location data specifies a sequence of vehicle locations, and wherein the processing 120 determines if the sequence of vehicle locations form a sequence of the vehicle's travel that is acceptable for the purposes of filing tax reports relating to the vehicle. Processing 130 further provides for determining the acceptability of the sequence according to one or more criteria. A potentially or actually unacceptable part of the sequence is displayed 140 to a user. The user is provided with one or more graphical user interface tools 150 that the user can employ to assess the unacceptable part of the sequence.

According to yet other example embodiments of method 100, the one or more tools include displaying a geographic map of the vehicle's location with the unacceptable portion indicated on the map, and/or the one or more tools includes displaying fuel record data to the user. Other example embodiments of method 100 provide for providing the user one or more graphical user interface tools that enable the user to accept or revise the vehicle location data for the unacceptable part of the sequence. According to still another embodiment, the foregoing embodiments of method 100 are used to prepare tax information formatted for use in filing a tax return.

According to still another example embodiment, a method 200 is provided for and includes electronically processing 210 digital vehicle location data specifying a sequence of vehicle locations, and graphically displaying 220 to a user a map showing a part of the sequence that is questionable. Input is accepted 230 from the user to adjust the questionable part of the sequence.

Figure 3:
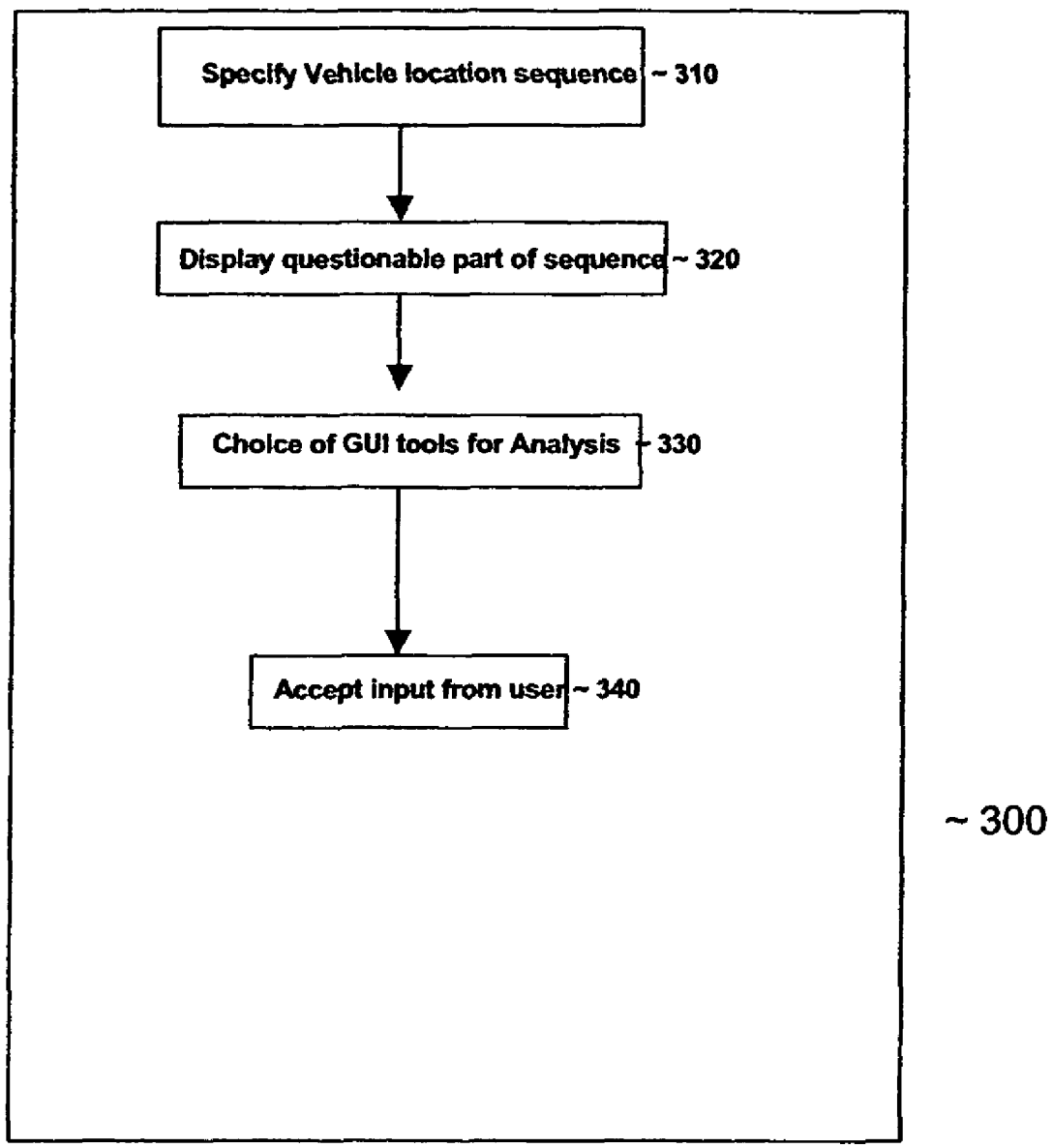
FIG. 3 is an example of a method according to an embodiment of the present invention.

According to still another alternate embodiment illustrated in FIG. 3, a method 300 provides for electronically processing 310 digital vehicle location data specifying a sequence of vehicle locations, displaying 320 to a user a part of the sequence that is questionable, offering 330 the user one or more graphical user interface tools that can be used to analyze the questionable part of the sequence, and accepting input 340 from the user to adjust the questionable part of the sequence.

Figure 4:
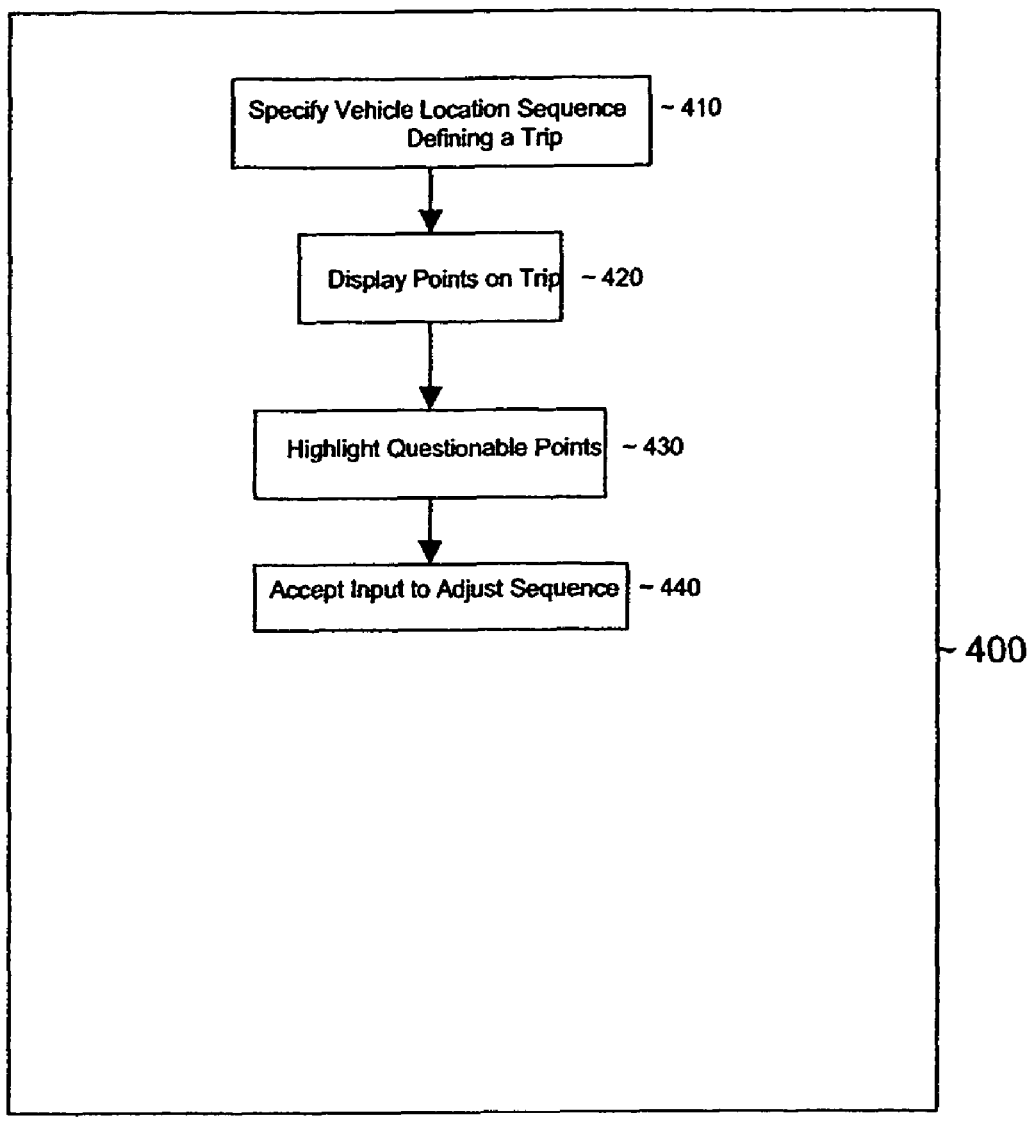
FIG. 4 is an example of a method according to an embodiment of the present invention.

According to still another alternate embodiment illustrated in FIG. 4, a method 400 provides for electronically processing 410 digital vehicle location data specifying a sequence of vehicle locations defining a trip, displaying 420 to a user a series of geographic points on the trip that describe the trip's path, highlighting 430 to a user one or more of the geographic points that are of questionable accuracy or reliability, and accepting input 440 from the user to adjust the questionable part of the sequence. According to one alternate embodiment the method further includes offering the user one or more graphical user interface tools that can be used to analyze the questionable part of the sequence.

According to an alternate embodiment of either one of the foregoing methods 200, 300 or 400, data is formatted for use in preparing a tax return.

Figure 5:
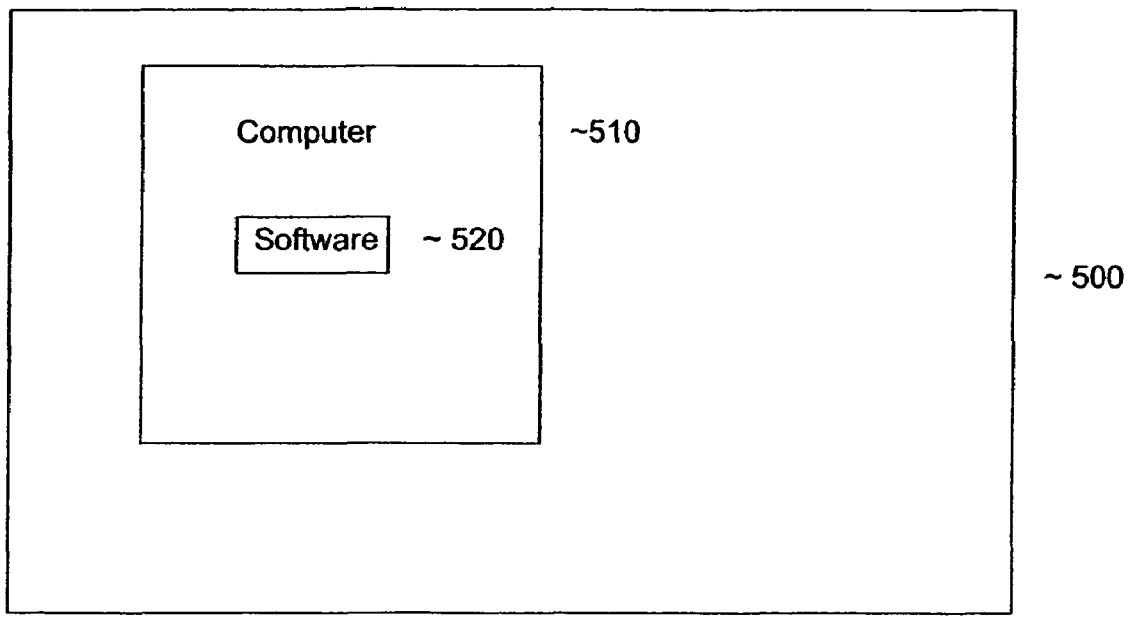
FIG. 5 is an example of a system according to an embodiment of the present invention.

Referring now to FIG. 5, yet another alternate embodiment is illustrated as system 500. System 500 includes a computer 510 programmed with software 520 to electronically process vehicle location data wherein the vehicle location data specifies a sequence of vehicle locations. Software 520 further provides that computer 510 processes to determine if the sequence of vehicle locations form a sequence of the vehicle's travel that is acceptable for the purposes of filing tax reports relating to the vehicle, wherein the acceptability of the sequence is determined according to one or more criteria. Software 520 further provides that the computer 510 is further programmed to display to a user a potentially or actually unacceptable part of the sequence and to provide to the user one or more graphical user interface tools that the user can employ to assess the unacceptable part of the sequence. According to yet another alternate embodiment, software 520 provides for programming computer 510 to format information useful for filing tax returns.

Figure 6:
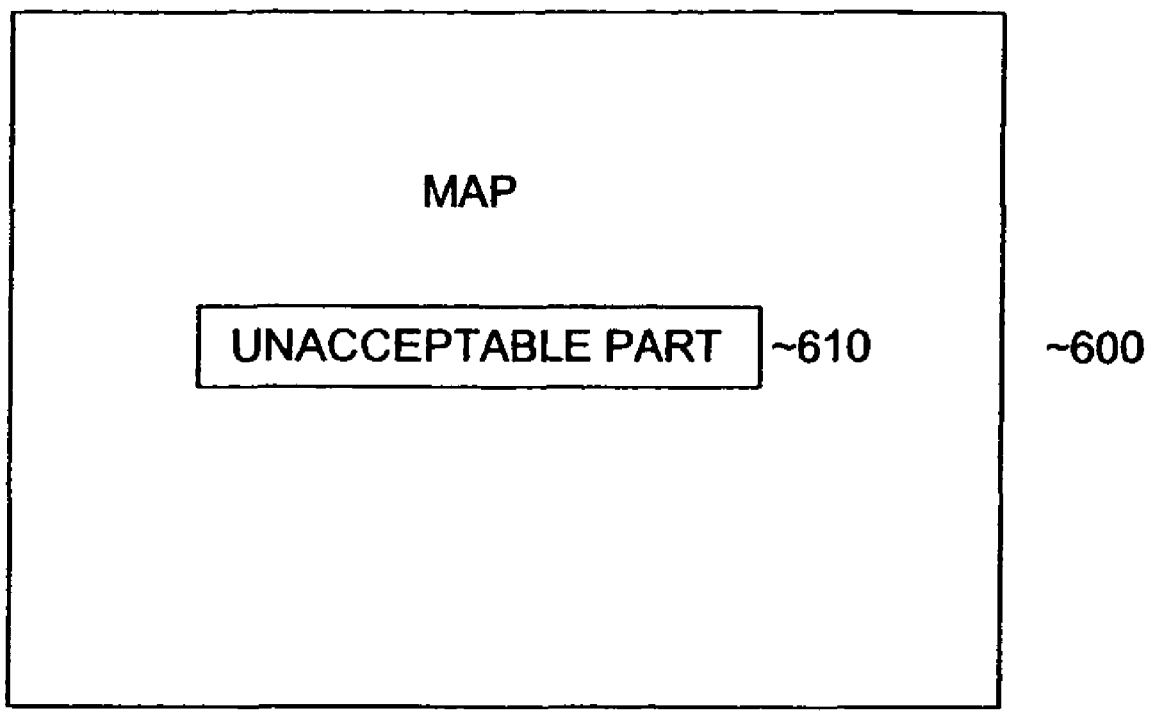
FIG. 6 is an example map to be used with an embodiment of the present invention.

Referring to FIG. 6, there is illustrated an example of a geographic map 600 of a vehicle's location, generated by the one or more tools, with the unacceptable portion 610 indicated on the map.

Figure 7:
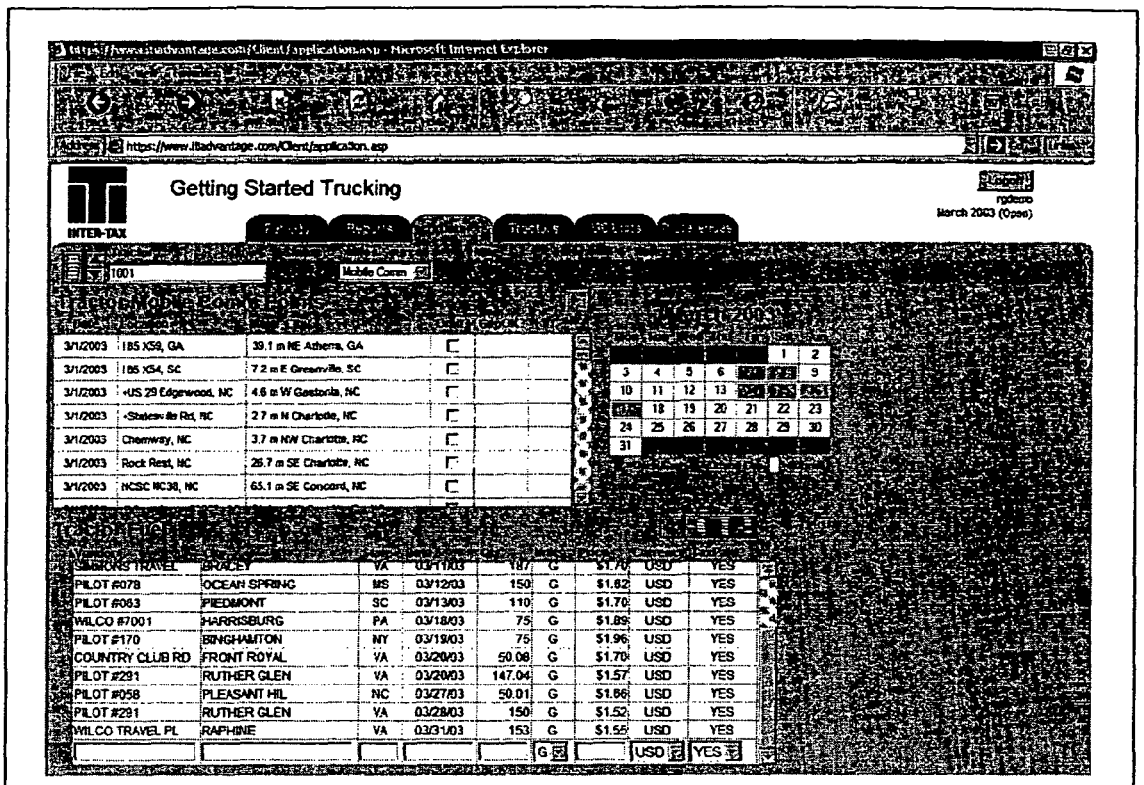
FIG. 7 is an example listing of fuel records to be used with an embodiment of the present invention.

Referring to FIG. 7, there is illustrated an example of fuel records 700 displayed to a user with the one or more tools.

Figure 8:
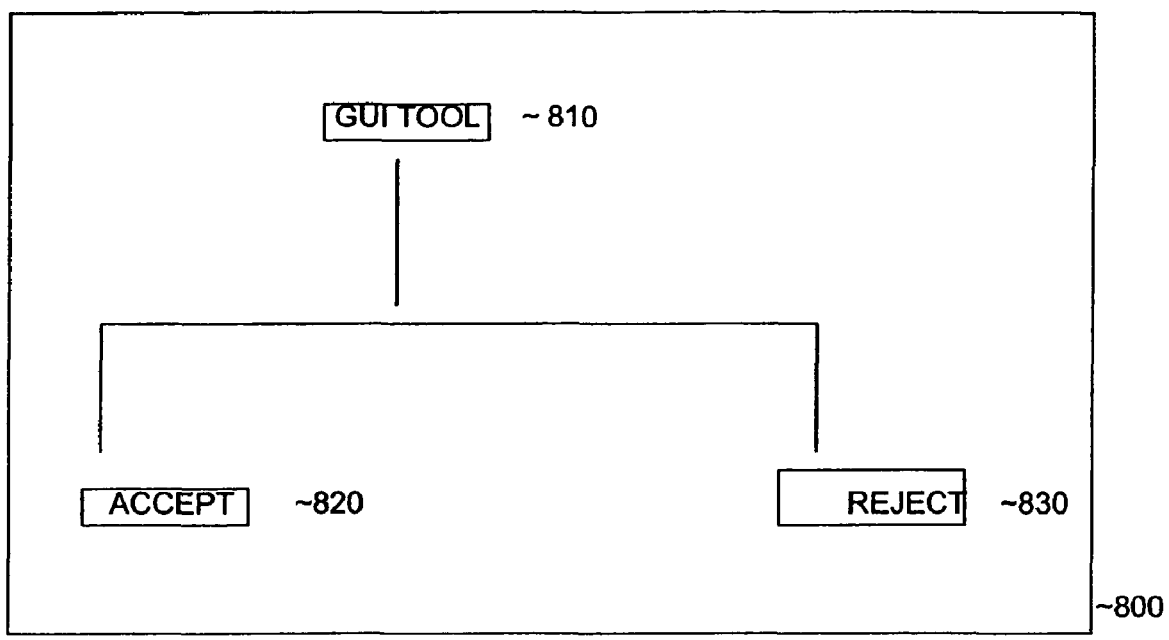
FIG. 8 is an example of a graphic interface tool according to an embodiment of the present invention.

Referring to FIG. 8, there is illustrated an example of a graphical interface tool 800 provided to a user to enable the user to accept or revise the vehicle location data for the unacceptable part of the sequence. Tool 800 allows a user to quickly investigate the vehicle location data for an unacceptable part of a sequence of a trip. This may include viewing a map, or logs that have been input into the system. The user can choose to accept the revised data as computed by the system or choose to go in and further revise the data themselves. Once the data is acceptable the tool enables the user to accept the revised data.

Figure 9:
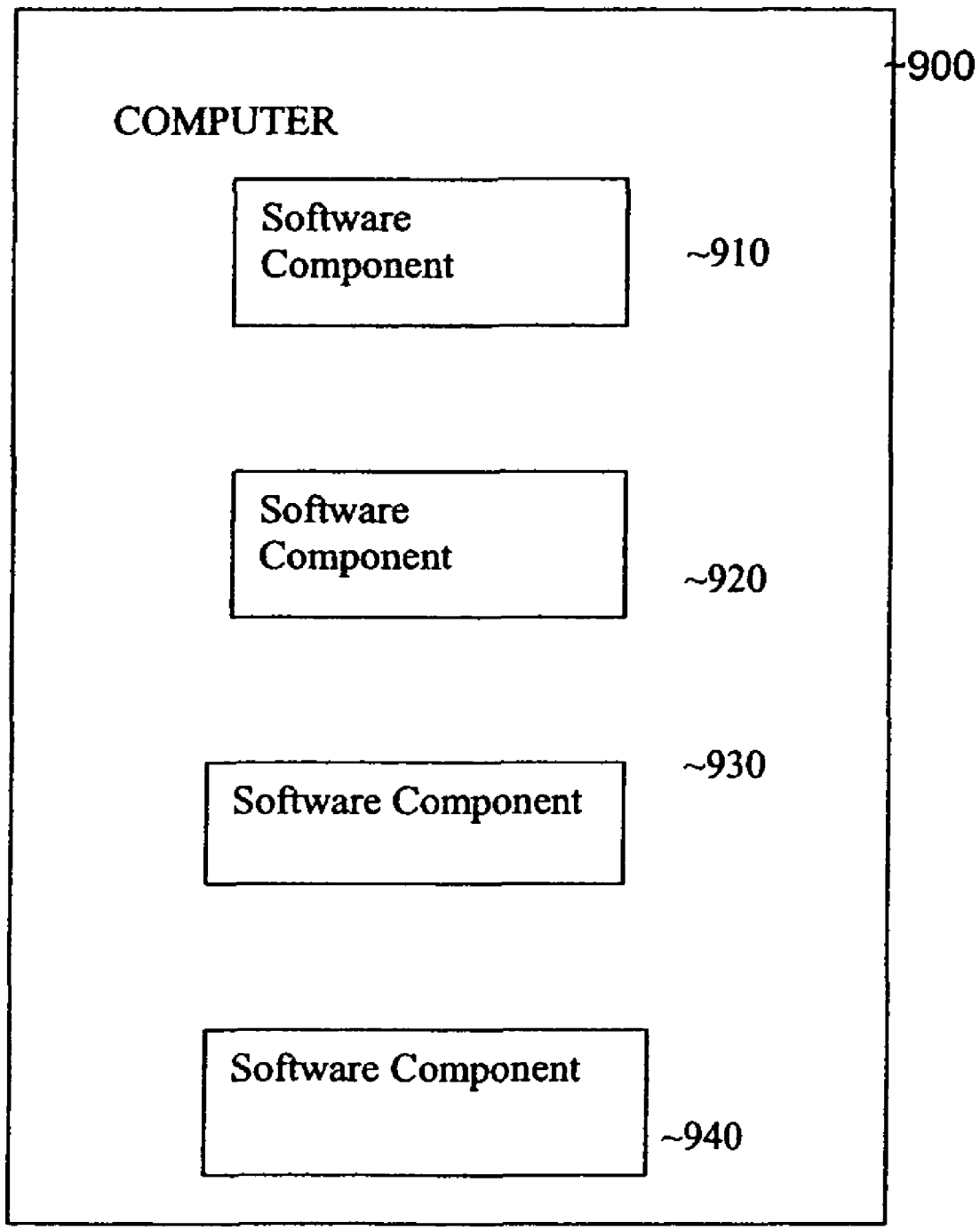
FIG. 9. is an example of a system according to an embodiment of the present invention.

Referring now to FIG. 9, there is illustrated yet another example embodiment of a computer system 900 according to the inventive subject matter herein. System 900 includes a first software component 910 operable on the computer to electronically processing digital vehicle location data specifying a sequence of vehicle locations. A second software component 920 is operable on the computer system to graphically display to a user a map showing a part of the sequence that is questionable. A third software component 930 is operable on the computer system to accept input from the user to adjust the questionable part of the sequence. According to another example embodiment, a software component 940 is operable on the computer system to format information useful for filing tax returns.

Figure 10:
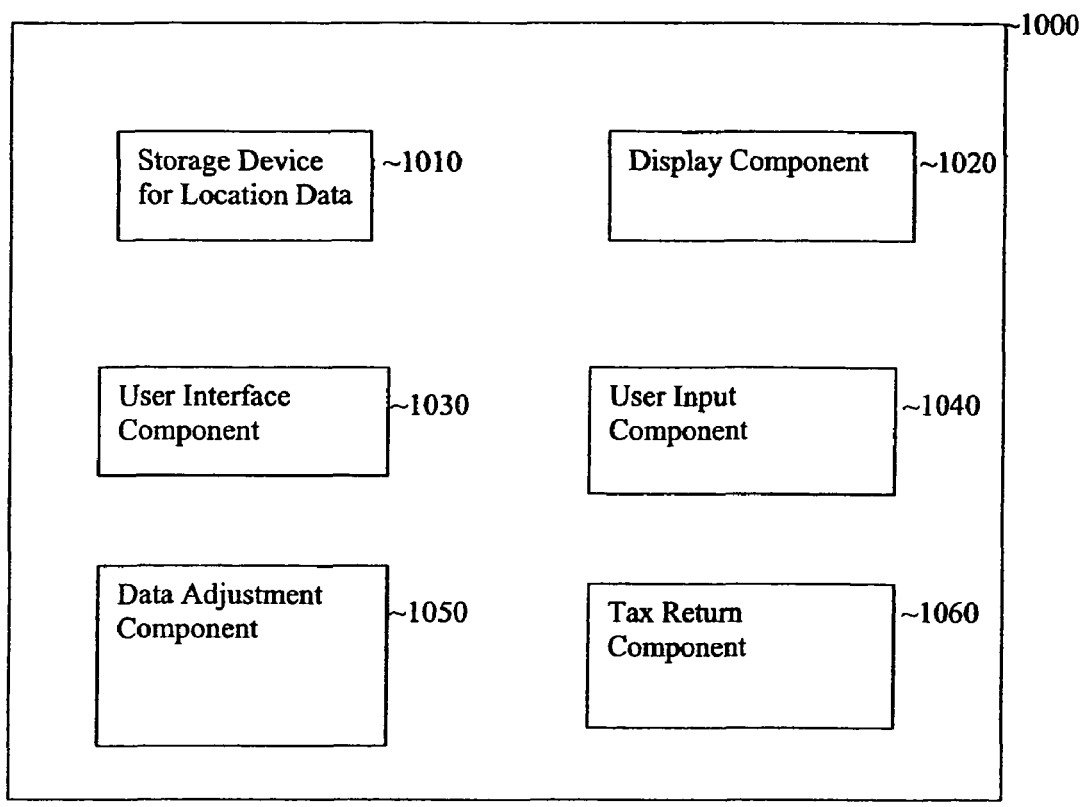
FIG. 10 is an example of a system according to an embodiment of the present invention.

Yet another example embodiment is illustrated in FIG. 10, wherein there is illustrated yet another example of a system 1000 according to the inventive subject matter herein. System 1000 includes a storage device 1010 for storing digital vehicle location data specifying a sequence of vehicle locations. A display component 1020 is provided to display to a user a part of the sequence that is questionable. A user interface component 1030 provides the user one or more graphical user interface tools that can be used to analyze the questionable part of the sequence. System 1000 further includes a user input component 1040 that receives data or command inputs from the user. A data adjustment component 1050 is also included and uses data or command inputs from the user to adjust the questionable part of the sequence. According to still another example embodiment, a tax return component 1060 is provided to format information useful for filing tax returns.

Figure 11:
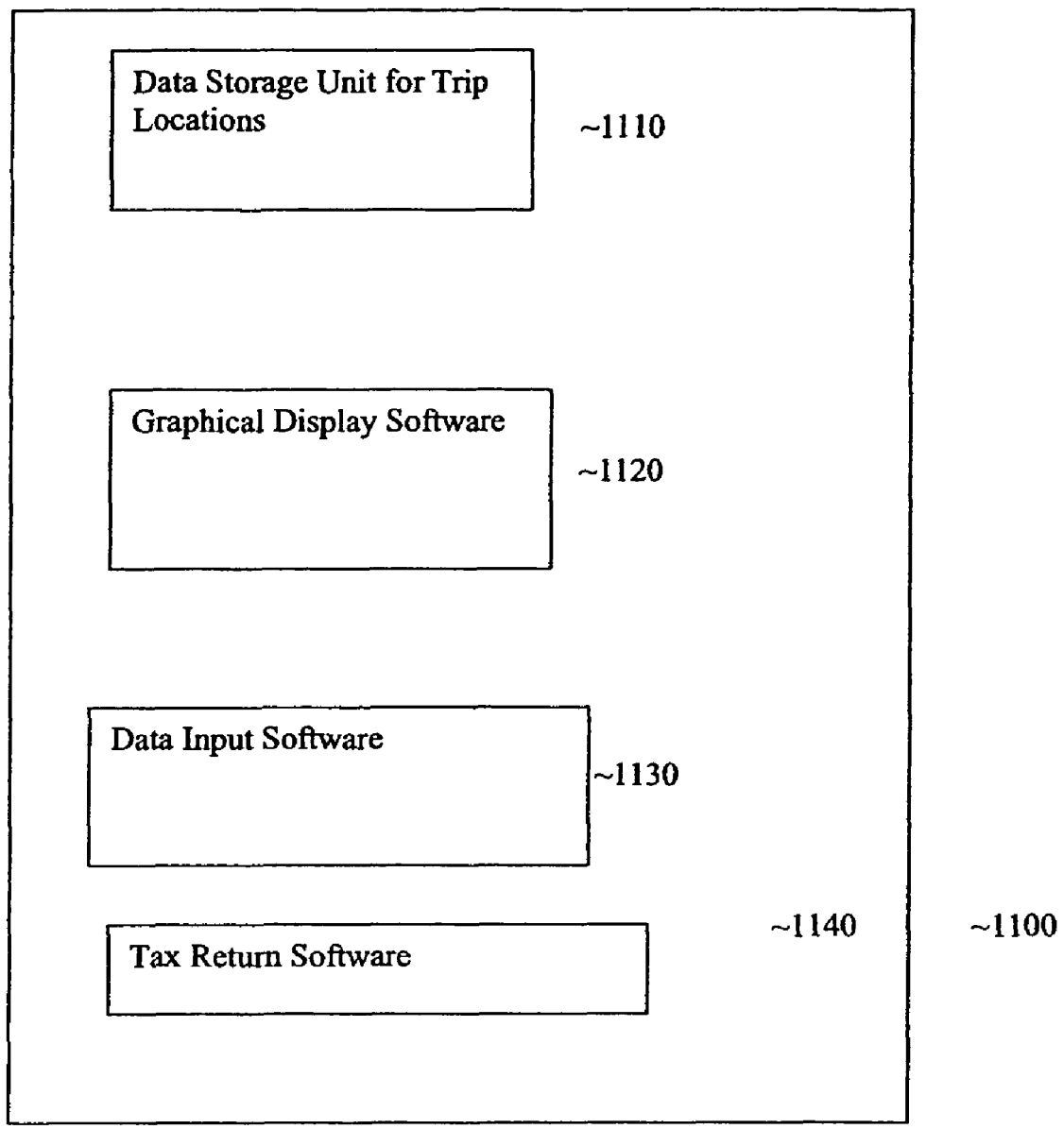
FIG. 11 is an example of a system according to an embodiment of the present invention.

According to still another example embodiment illustrated in FIG. 11, a system 1100 includes a data storage unit 1110 that stores digital vehicle location data specifying a sequence of vehicle locations defining a trip. Graphical display software 1120 is operable on a computer that generates a display of a series of geographic points on the trip that describe the trip's path. The graphical display software 1120 is further operable on the computer to highlight one or more of the geographic points that are of questionable accuracy or reliability. Data input software 1130 is operable on the computer to accept input from a user to adjust or accept the questionable part of the sequence. According to an alternate embodiment, system 1100 includes tax return software 1140 operable on the computer to format information useful for filing tax returns. According to still another example embodiment, the graphical display software 1120 is operable on the computer to offer the user one or more graphical user interface tools that can be used to analyze the questionable part of the sequence.

Figure 12:
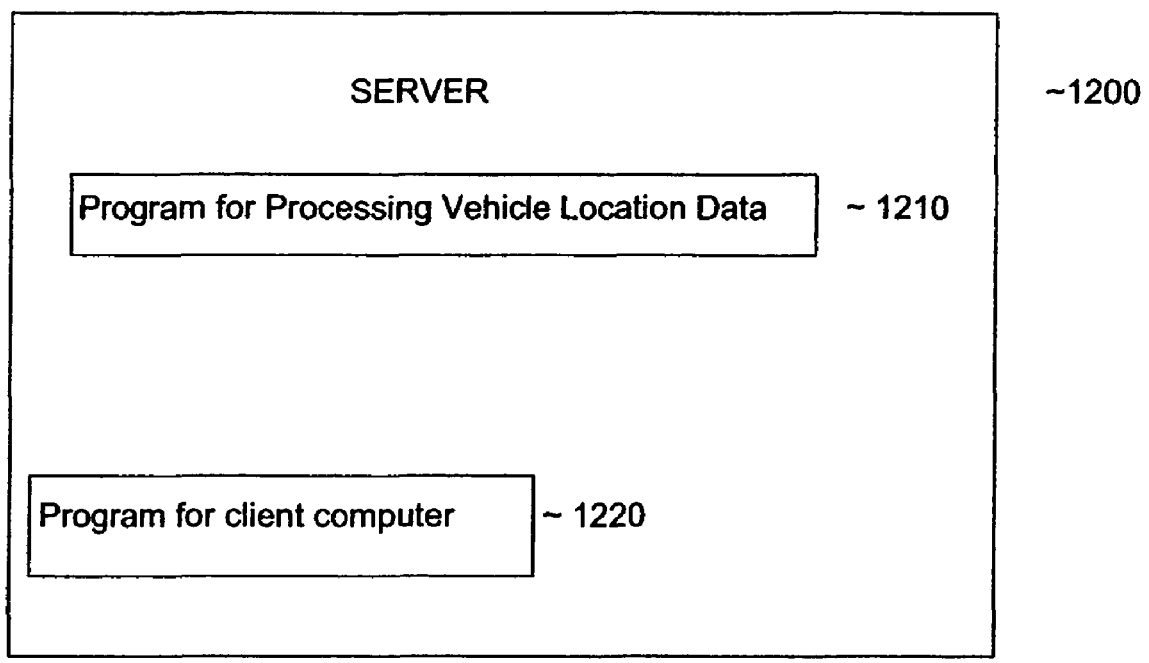
FIG. 12 is an example of a system according to an embodiment of the present invention.

According to still another example embodiment of the inventive subject matter herein illustrated in FIG. 12, there is provided a server 1200 programmed 1210 to electronically process vehicle location data wherein the vehicle location data specifies a sequence of vehicle locations, wherein the processing determines if the sequence of vehicle locations form a sequence of the vehicle's travel that is acceptable for the purposes of filing tax reports relating to the vehicle, and wherein the acceptability of the sequence is determined according to one or more criteria. Server 1200 is further programmed 1220 to generate display commands or data used by a client computer to display potentially or actually unacceptable part of the sequence and to provide to the user one or more graphical user interface tools that the user can employ to assess the unacceptable part of the sequence.

According to still another example embodiment of server 1200, it is programmed to format information useful for filing tax returns. According to still another embodiment, the one or more tools includes displaying a geographic map of the vehicle's location with the unacceptable portion indicated on the map. According to still another example embodiment, the one or more tools includes displaying fuel record data to the user. According to yet another example embodiment, the server provides the user one more graphical user interface tools that enable the user to accept or revise the vehicle location data for the unacceptable part of the sequence.

Figure 13A:
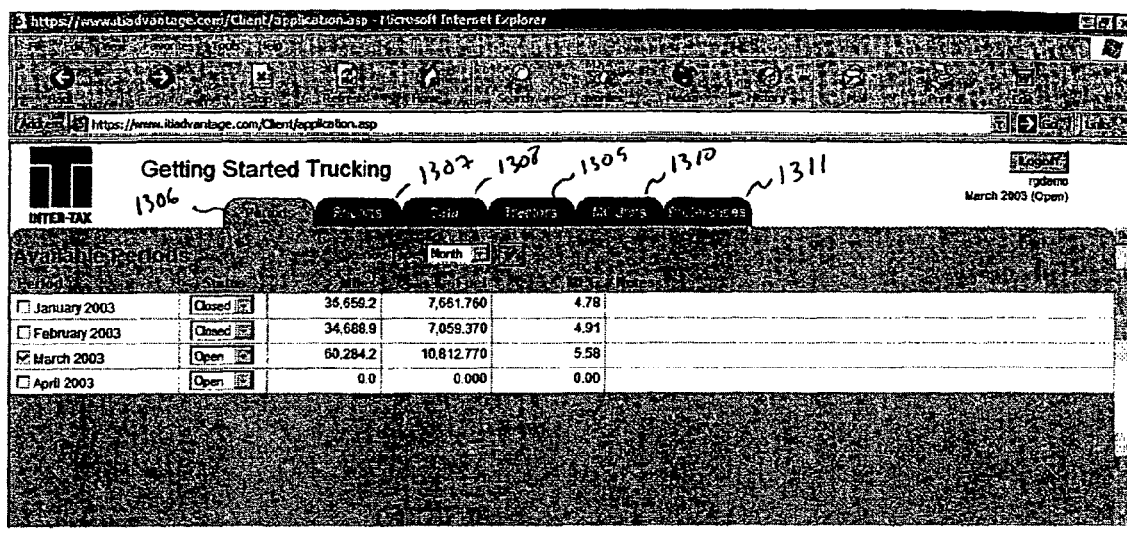
FIG. 13A is an example of an overview of a User Interface according to an embodiment of the present invention.

FIG. 13A is the overview of the UI 1300. Advantage™ separates the tax processing functions with six tabs, 1306 to 1311.

Figure 13B:
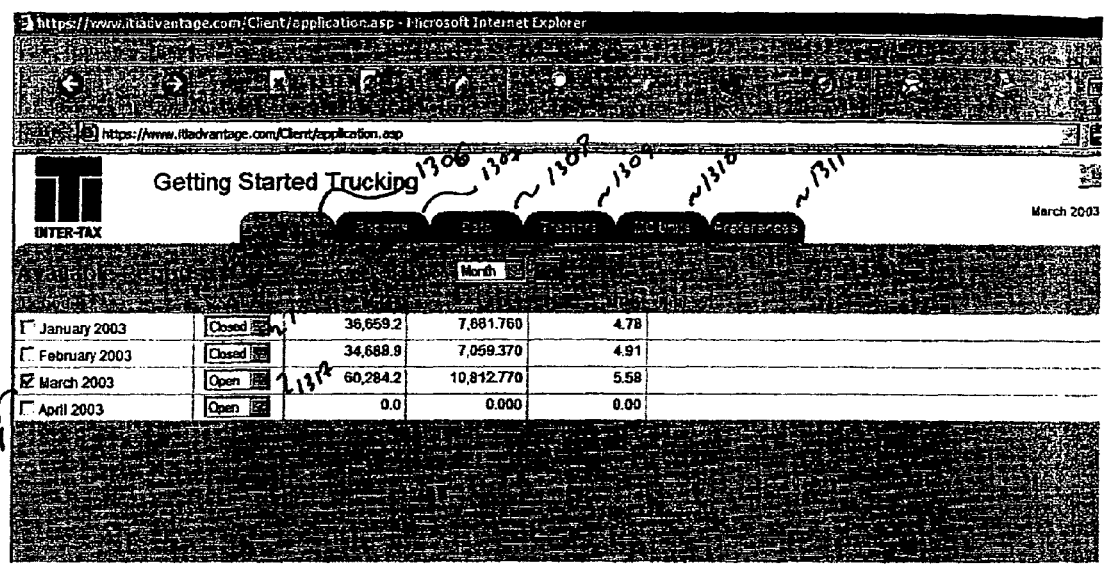
FIGS. 13B to 13P are examples of screenshots of a user interface according to embodiments of the present invention.

As illustrated in FIG. 13B, the period screen 1306 is the first screen displayed after log-on to this web site. In the example illustration of UI 1300, records are being processed for a company named "Getting Started Trucking," and January 2003 and February 2003 have already been completed as indicated in the status column 1315, by the 'closed' indicator of 1316. March 2003 1318 is still open as indicated by the 'open' indicator at 1317 and upon completion of the March 2003 data preparation, as will now be described, the system will be ready to produce a report, such as a quarterly report.

In one embodiment, as shown in FIG. 13C, the data screen 1308 defaults are initially set to Problem Tractors 1320 and Mobile Comm Miles Source 1321. This is because one of the purposes of UI 1300 is to first fix data associated with tractors with data issues so that one can move on to printing reports. In this example, there are seven tractors with problem trips that will need to be fixed before reports can be run. For example, Tractor 1001 is the problem tractor with problem view 1322.

Figure 13D:
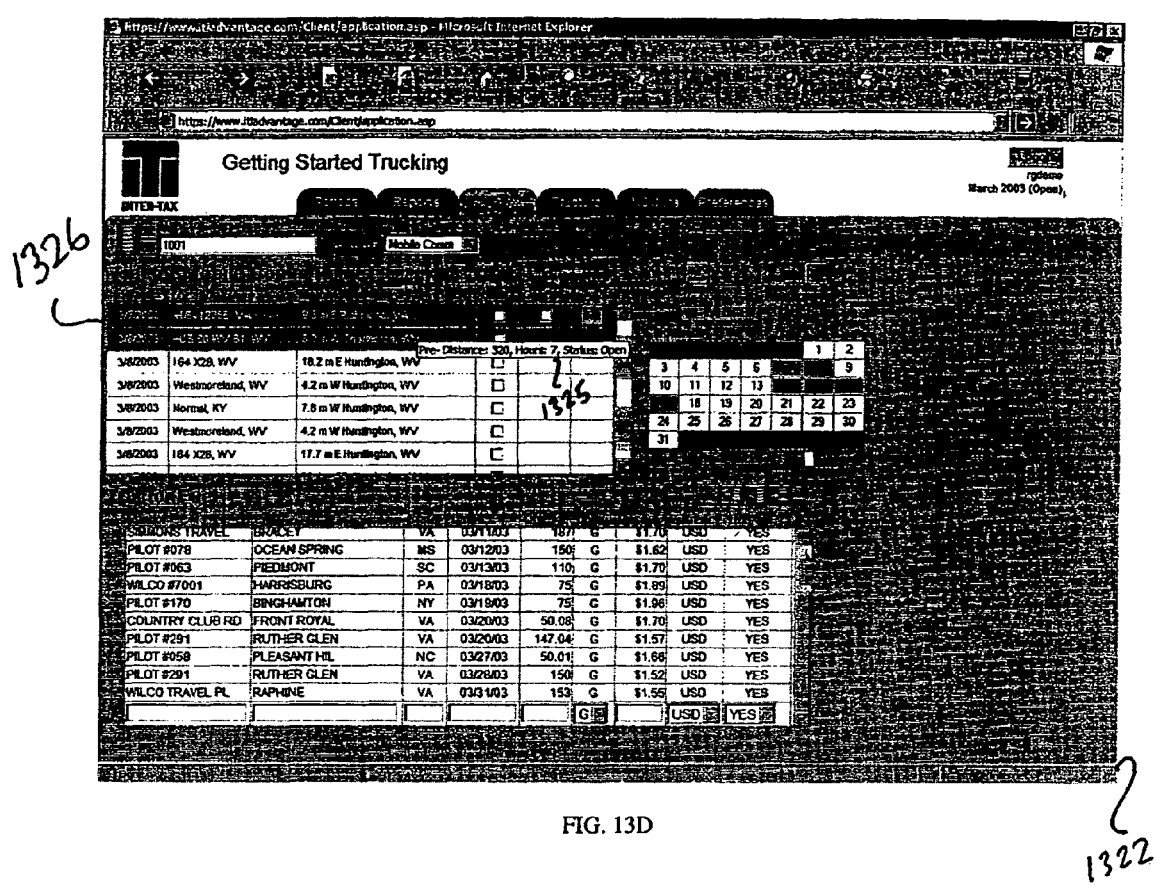

In FIG. 13D, there is shown a detail view of problem view 1322 for tractor 1001. In an embodiment, this detail view 1322 can be accessed by clicking on tractor 1001 in detail screen 1308, starting from FIG. 13C. In this example, in detail view 1322 an entire stream of GPS data 1326 is displayed for the currently selected month for tractor 1001. In an embodiment, gaps or periods of time where GPS data was not received are denoted by highlighted portions in the display area 1326 of detail view 1322. In a further embodiment, this highlighting is done by displaying the gap points in a purple color. The UI 1300 automatically brings up the first gap of the month for the problem tractor under consideration. In the example of FIG. 13D, for tractor 1001 the first gap occurred on Mar. 7, 2003. Detail view 1322 shows that there are 320 miles and 7 hours between GPS pings, as shown at 1325. In an embodiment, this information is accessed in UI 1300 by mousing over a screen region 1326. By selecting the 'Fill' button 1327, the UI 1300 brings up fueling points that may have occurred in this gap, so that a user can fill in the route line and clear the gap 1325. In an alternate embodiment, the UI brings up dispatch points that may have occurred in this gap, so that a user can fill in the route line and clear the gap. That is, physical tops scheduled by a trucking dispatch can be used to fill gaps in a route. In an embodiment, the user can select the 'Fill' button 1327 with any of a variety of input devices, including, but not limited to, a mouse, trackpad, trackball, etc.

Figure 13E:
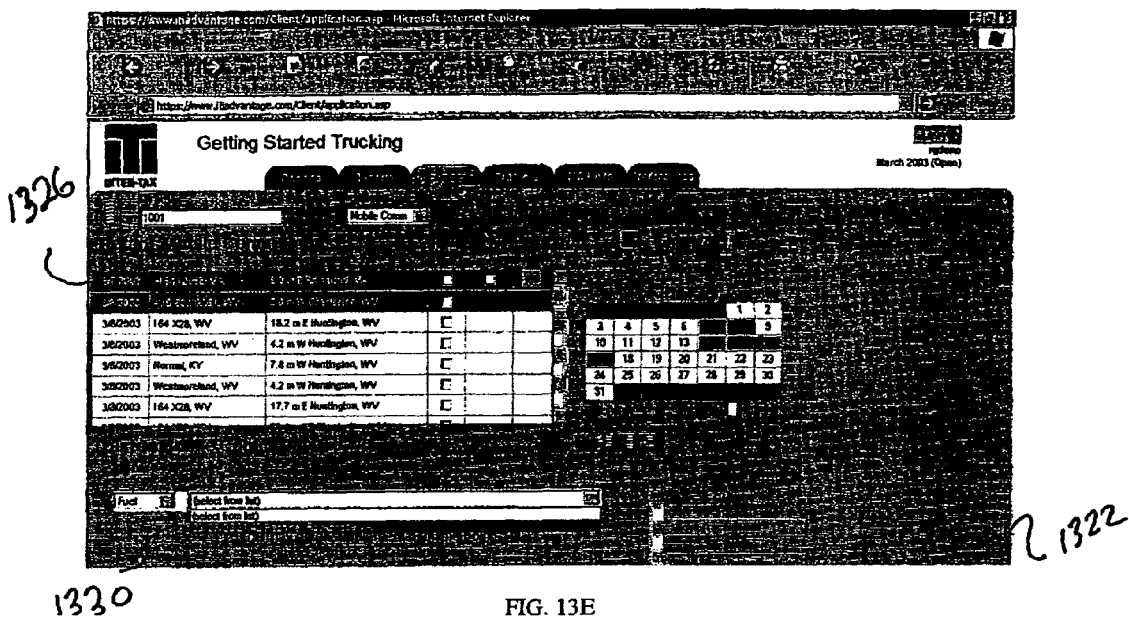
Figure 13F:
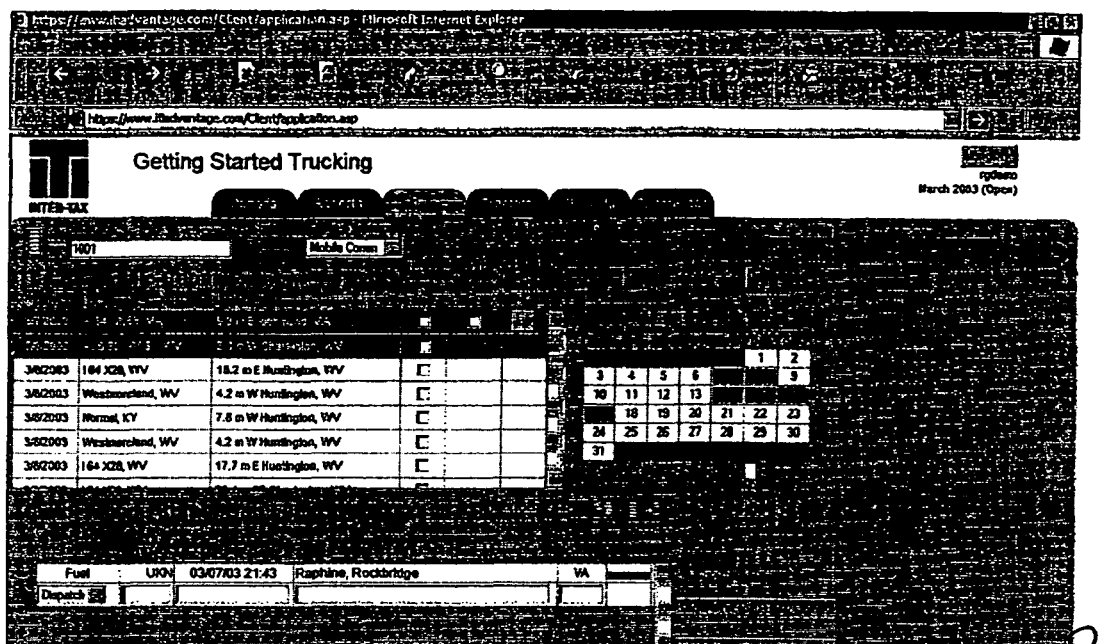
Figure 13G:
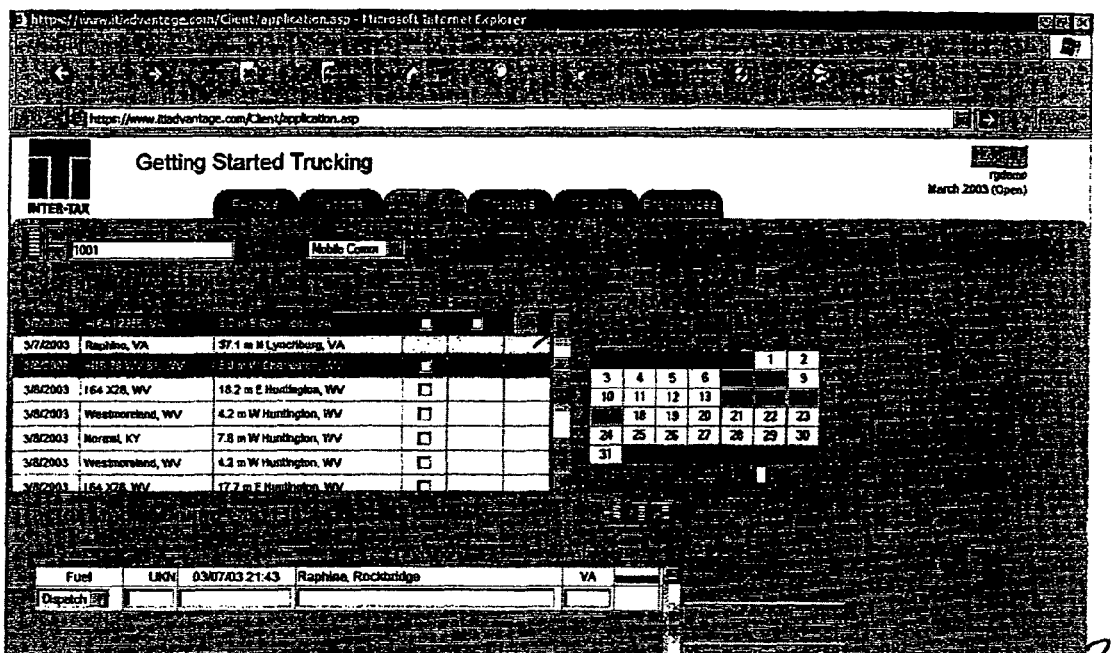

In FIG. 13E is shown an example where the UI 1300 has brought up a fueling point that may have occurred in the gap 1325 of FIG. 13D. The UI 1300 automatically selects the fuel points closest in time to the gap and displays 1330 them. In the example given by FIG. 13E the tractor stopped to by fuel in Raphine, Va. on Mar. 7, 2003. A user of the system can then select this fuel point as if it were a GPS point. Once the user has filled the gap, it can then be okayed by the user in the UI 1300. In an example the system creates a practical route between the start and end gap points, including any points the user adds. In an example the user can select the fuel point to fill in the gap by selecting the fuel point being currently display, such as at 1330. In an embodiment, the user selects a fuel point to fill the gap by left-clicking with a mouse or other suitable input device. Once the user selects a fuel point to fill the gap, they can approve their selection by selecting the green arrow, such as depicted by 1335 of the detail screen 1322 in FIG. 13F. After a user has approved the selection, the gap changes color, signifying that it is closed, as depicted at 1340 of detail screen 1322 of FIG. 13G.

Figure 16:
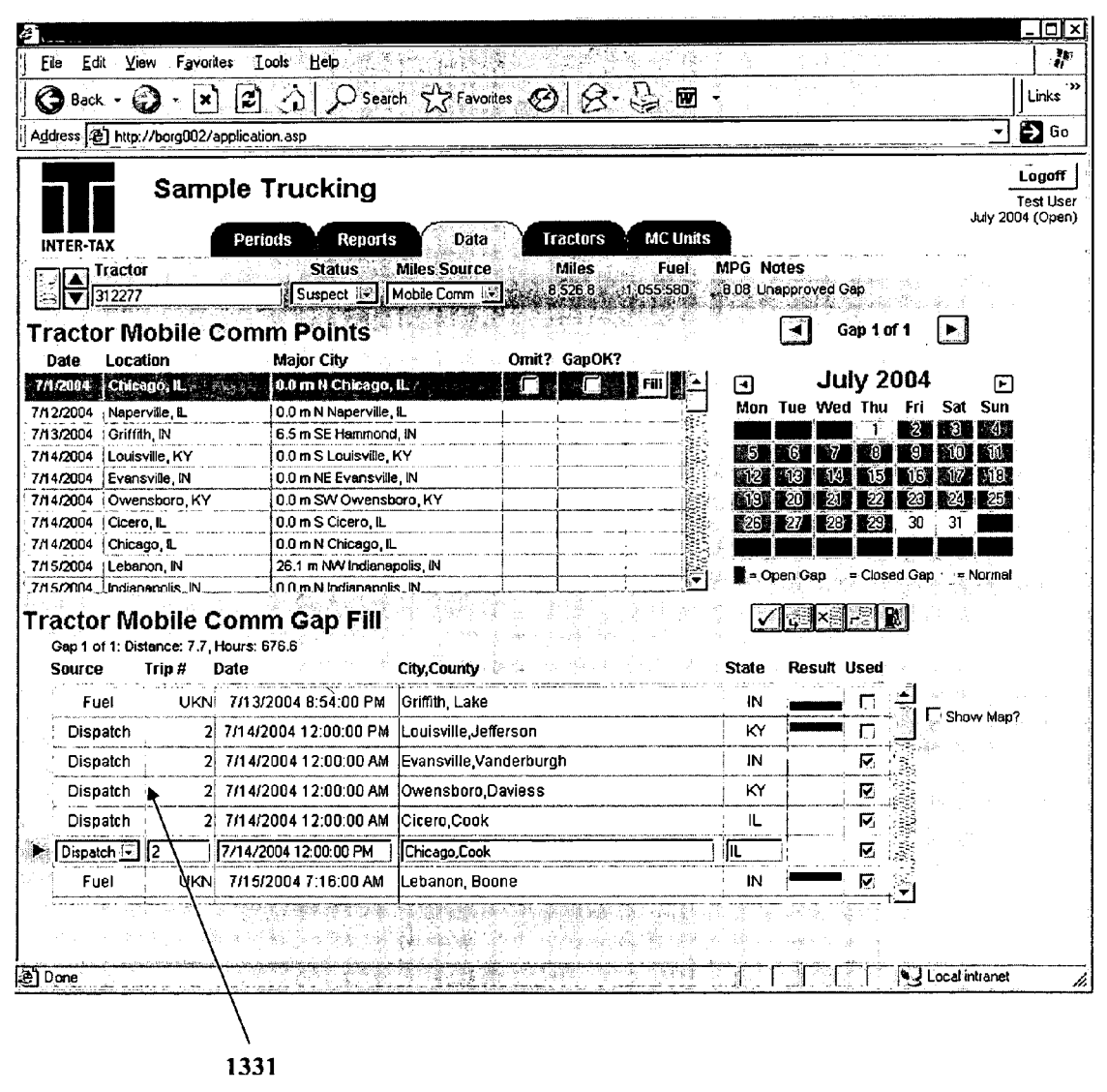

Referring to FIG. 16, an alternate embodiment is illustrated in a screenshot of a UI where dispatch details 1331 are illustrated. In this example the UI has brought up several dispatch points that may have occurred in a route gap. The UI automatically selects the dispatch points closest in time to the route gap and displays them. A user of the system can then select a dispatch point 1331 as if it were a GPS point. Once the user has filled the gap, it can then be okayed by the user in the UI. In an embodiment, the user selects a dispatch point to fill the gap by left-clicking with a mouse or other suitable input device.

Figure 13H:
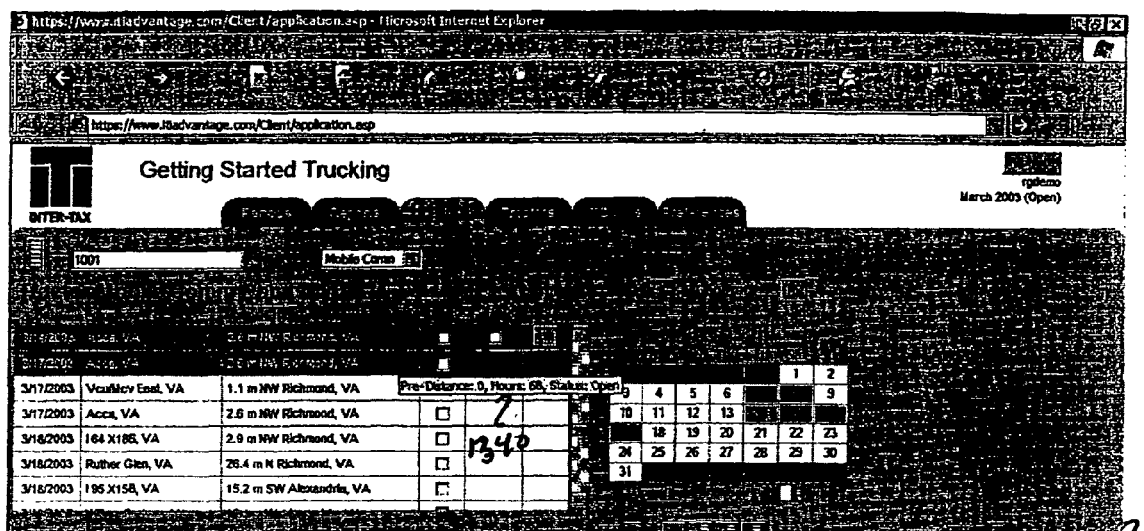
Figure 13I:
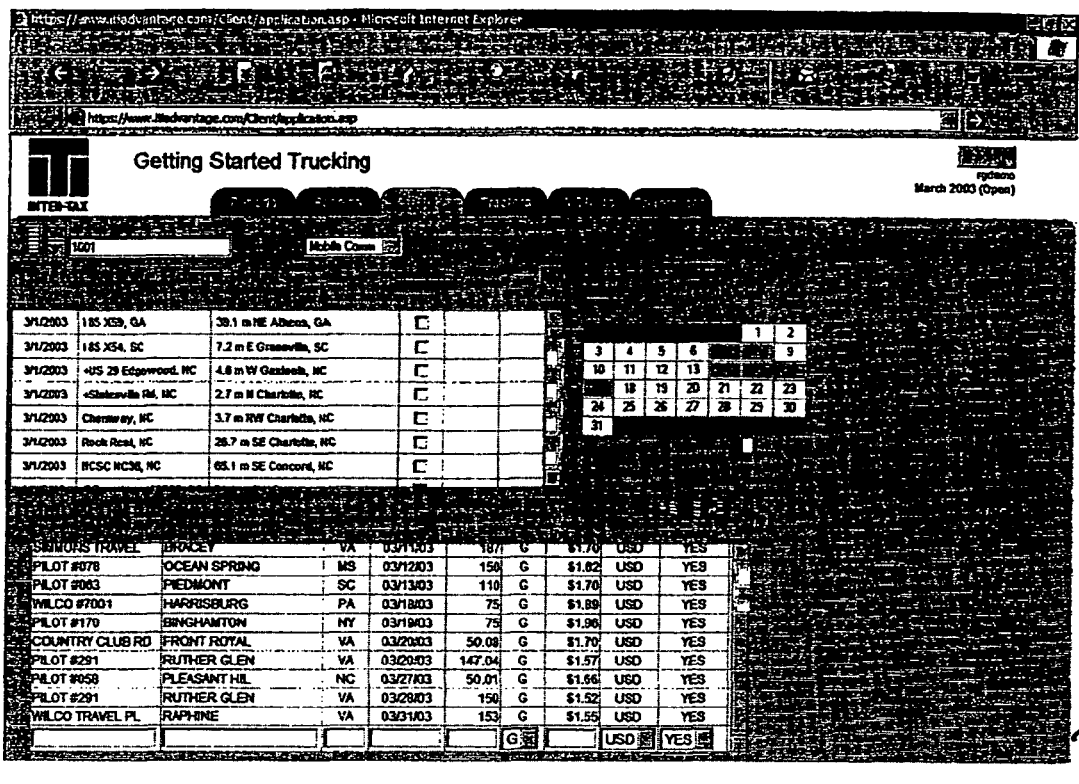

In FIG. 13H is shown an example where the UI 1300 is displaying a gap for a problem tractor under consideration. In FIG. 13D through FIG. 13G, and 16 and the accompanying description the process of clearing a gap in data for the problem tractor is detailed. In FIG. 13H the user can mouse over or by some other selecting means display the gap distance for the remaining gap for the tractor under consideration. In the example of FIG. 13H it is shown that the gap is 0 mile gap 1340. The user can than clear the gap by selecting the GapOK? box 1341. In an example, after the user selects the GapOK? box 1341 and in doing so clears the last gap for the tractor under consideration the status, currently given as Problem 1343 will change to Good 1344 as shown by the example UI screenshot of FIG. 13I. Once the user has cleared all gaps for the tractor under consideration, they may wish to proceed to the next tractor that has problems. In the example of FIG. 13I the user may click or by some other means select the next button 1345 and in doing so move to the next tractor, as shown by the UI screenshot 1350 of FIG. 13J.

Figure 13J:
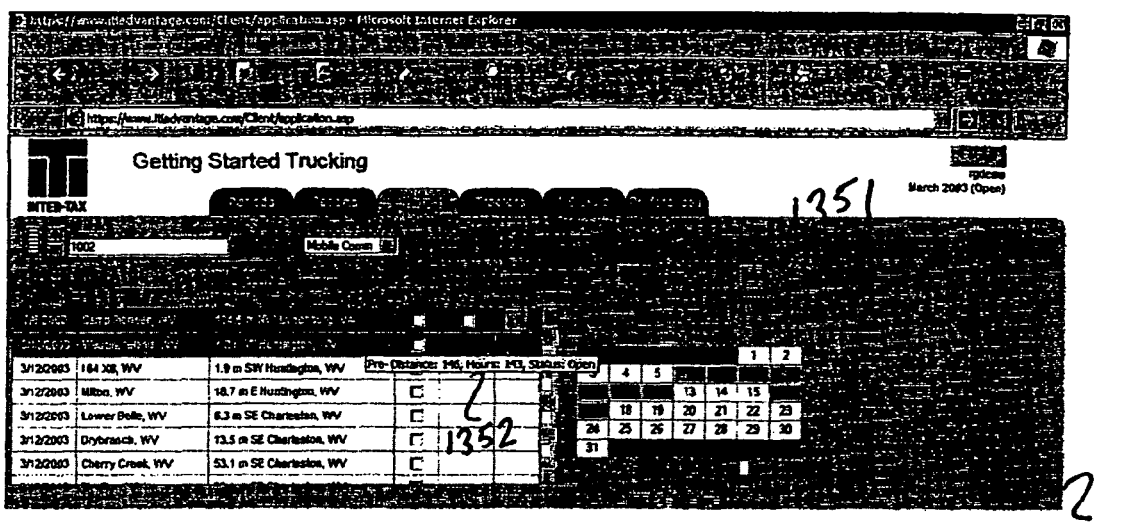
Figure 13K:
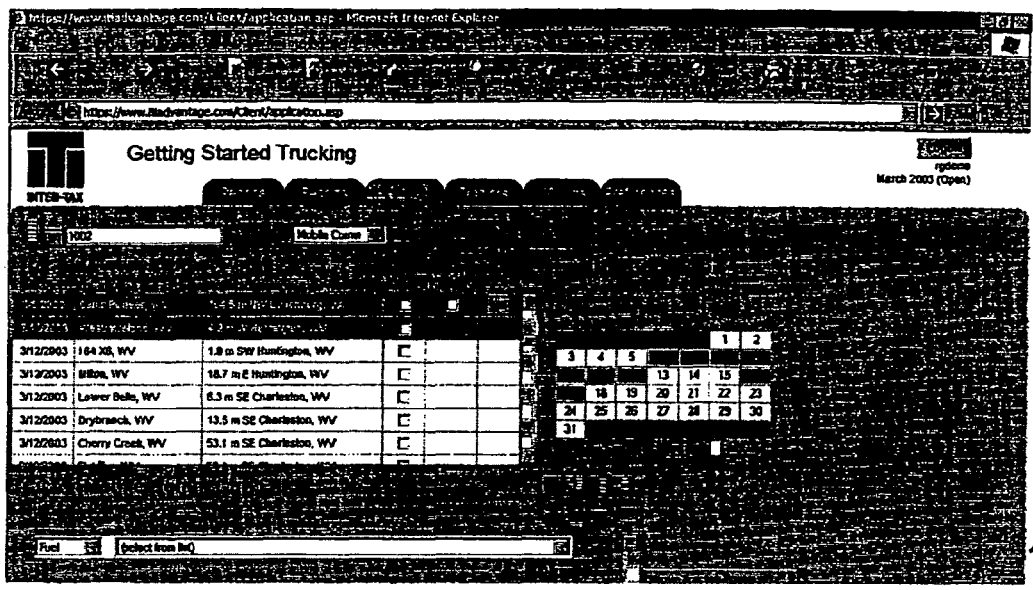
Figure 13L:
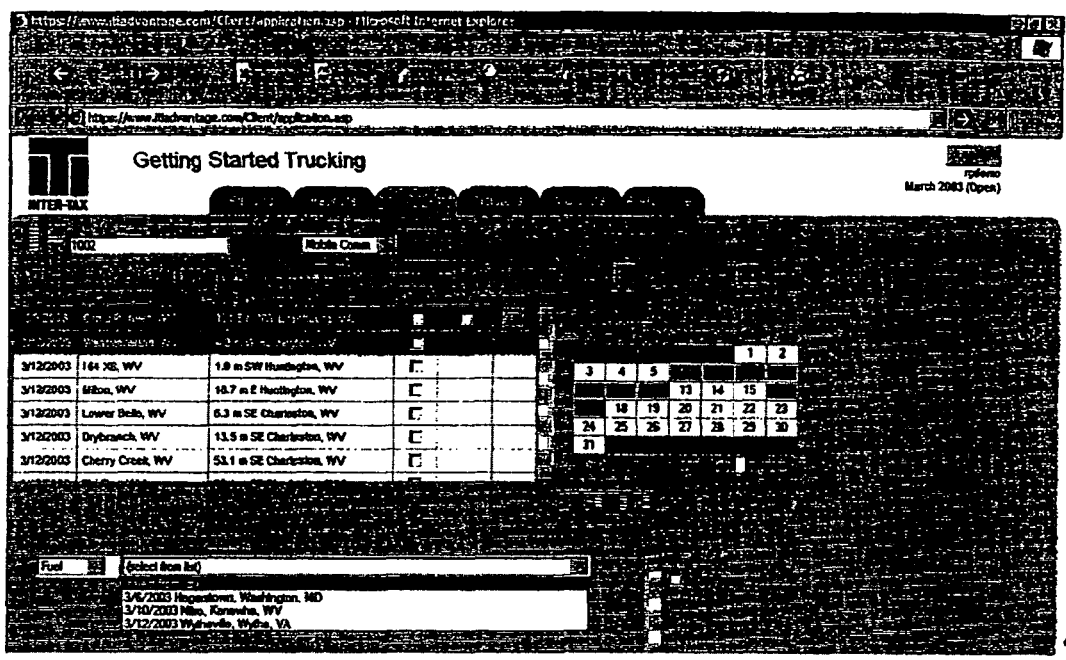
Figure 13M:
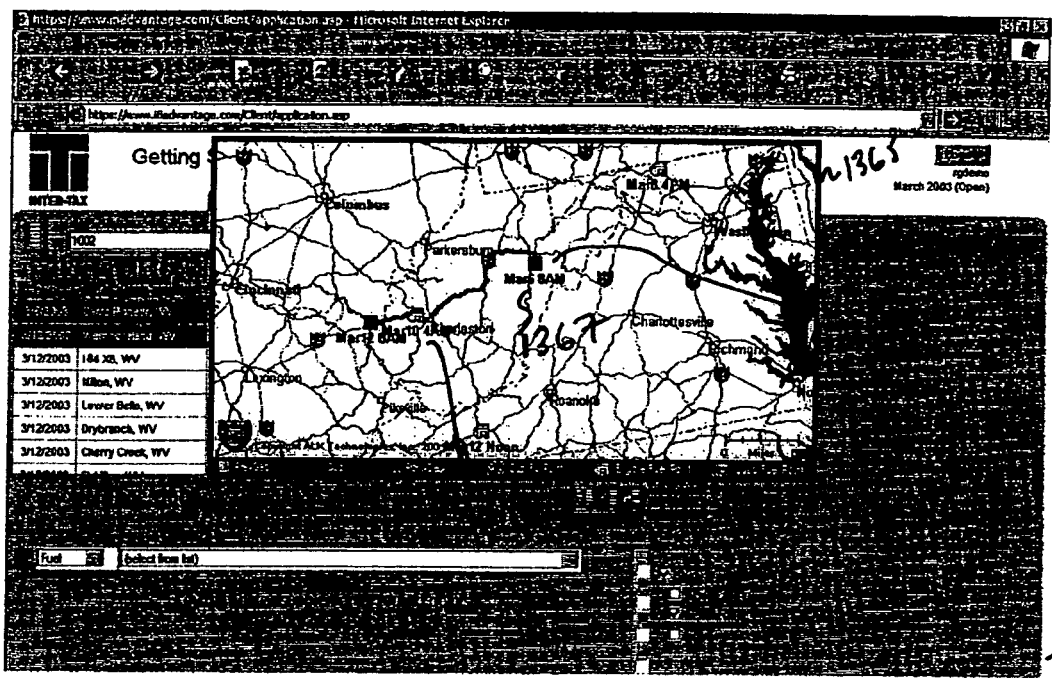
Figure 13N:
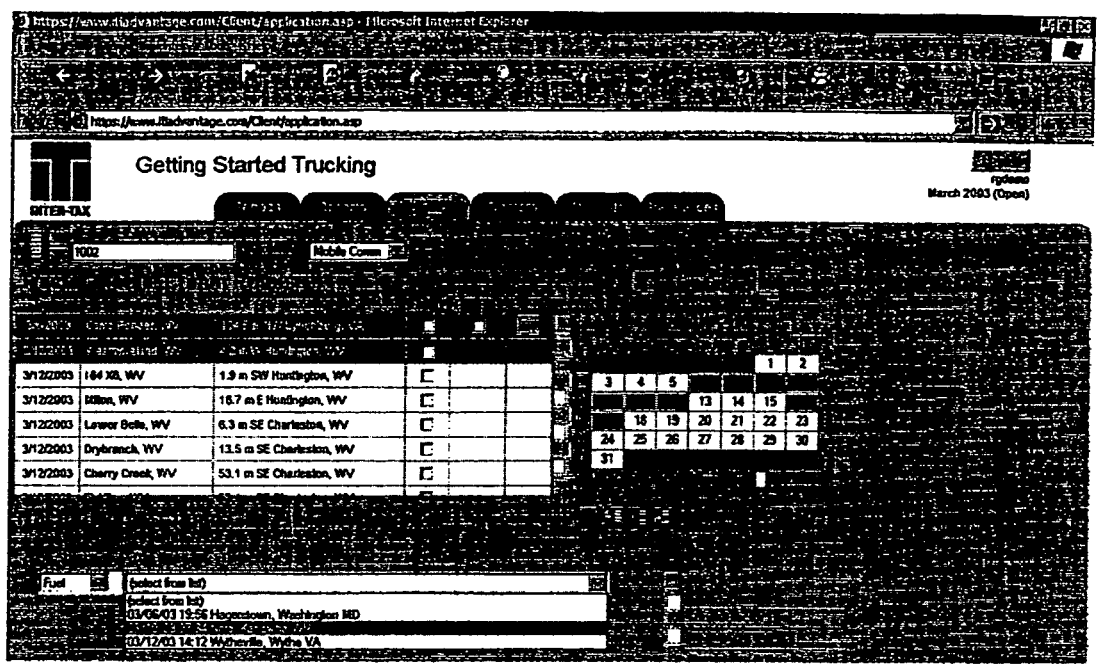
Figure 13O:
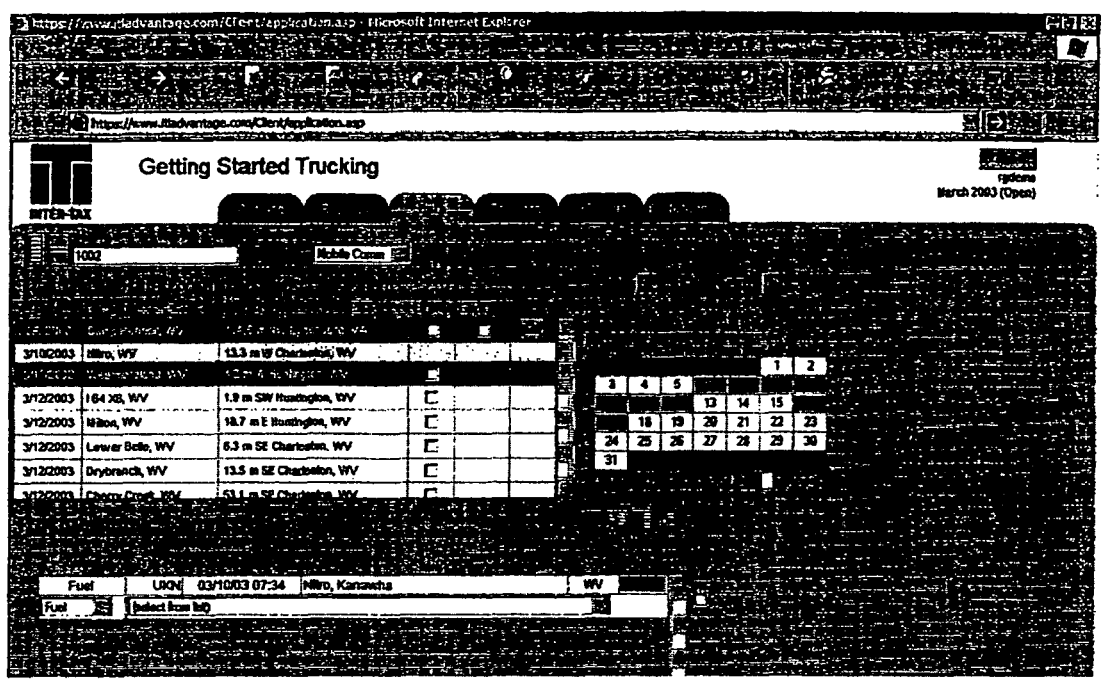
Figure 13P:
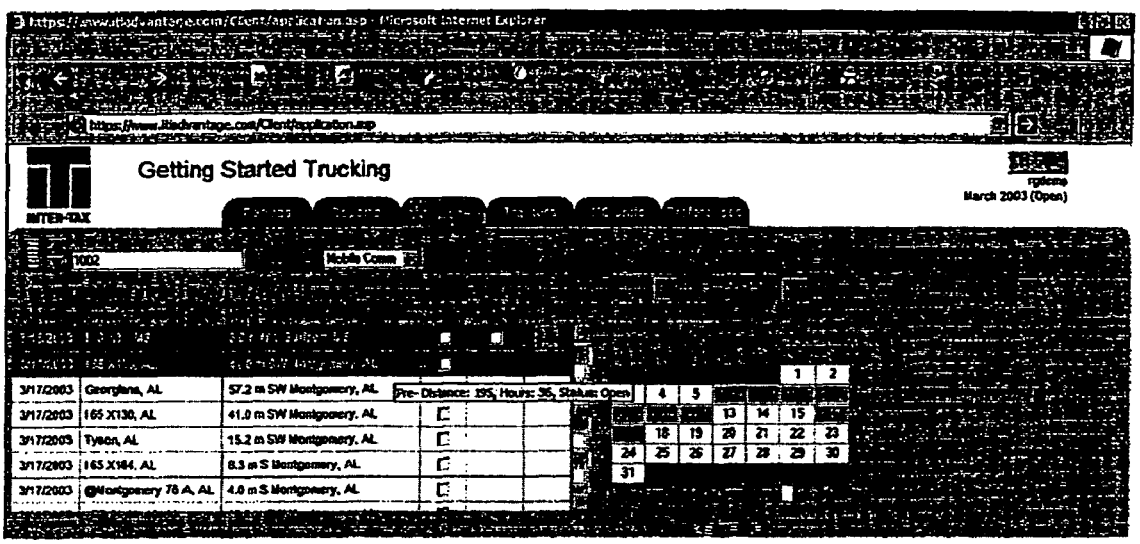

In the example of FIG. 13J, it is shown that the tractor under consideration has two gaps in its data and the UI screenshot 1350 is showing Gap 1 of 2 1351. By mousing over the highlighted region, the user is presented with a display as to the gap distance for gap 1 of 2. In this example, the gap is 146 miles 1352. The user by clicking on the Fill button 1353 will proceed to the UI screenshot 1356 of FIG. 13K. In the example of FIG. 13K the user may wish to choose to fill the gap with fuel point data and by clicking on the pulldown arrow 1355 the user can be displayed a list of fuel points that may be used to fill the gap, such as that displayed in FIG. 13L. In the example of FIG. 13L it is not easily identified which fuel point can be used to fill the gap. The UI 1300 provides the user with the ability to view a map from which the user can determine which fuel points may have occurred in the gap under investigation. The user can choose to view the map by selecting the Show Map? button 1360 of FIG. 13L. Upon the selection of this option a map, similar to the map 1365 of FIG. 13M, will be displayed. This map 1365 shows the location of fuel points. The user has the ability to customize the map 1365 by choosing to include pre-gap 1369 and include post-gap 1370 fuel points. In the example of FIG. 13M the UI 1300 will display on the map 1365 a practical route between the first 1365 and last 1371 GPS gap points. The yellow mark 1368 shows eligible fuel stops. Under each of the eligible fuel stops is shown a date and time. In the example of FIG. 13M the only fuel stop that occurred in the gap was on March 10 as shown by the single yellow mark 1368. The user may return to the screen showing a pull-down menu similar to the pull-down menu 1376 of FIG. 13N or the user can select the fuel stop identified in the map 1365 of FIG. 13M. By clicking on the check mark button 1377 the user can choose to use this fuel stop to fill in the gap. In the example of FIG. 13O it is shown that the fuel stop identified on the map 1365 of FIG. 13M has been included in the list of Comm Points as indicated in the line of 1383. By selecting the GapOK? checkbox 1382 the user can OK the gap and clear the first of the two gaps for the tractor under consideration. In the example of FIG. 13P it is further shown the second gap for this tractor. The user can proceed as disclosed above to investigate this gap and fill in the data points with whatever data item is appropriate.

Figure 14A:
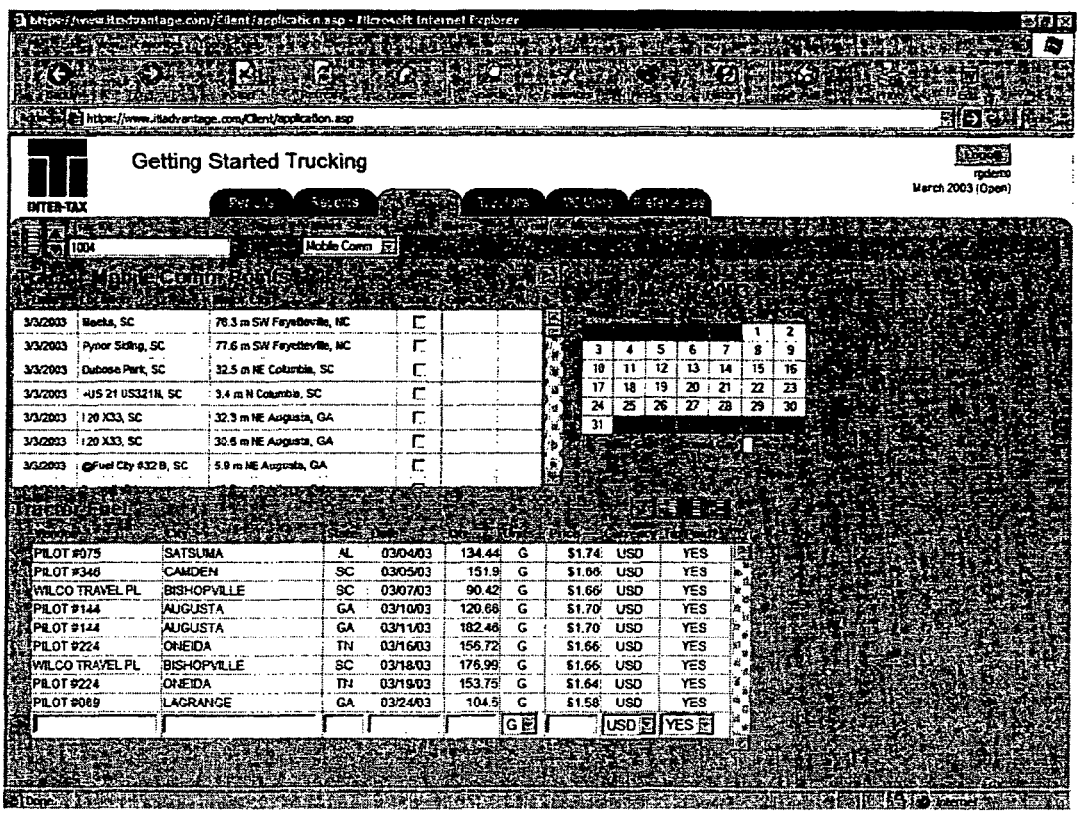

In FIG. 14A is shown an example where the UI 1300 is displaying a tractor whose problem is not a gap of distance. In FIG. 14A the Comm Points screen 1403 shows no gap of distance between Comm Points. However, the tractor under consideration, tractor 1004 1401 still displays with a Problem 1405 status. The user investigating tractor 1004 1401 will see the UI 1300 has displayed a message in relation to the fuel mileage, in the example miles per gallon (MPG), that the MPG is out of range 1402. The system computes a likely range for fuel mileage and if mileage outside of that is computed the UI 1300 can display a message to that effect. Though the term mileage is used, it will be recognized by those skilled in the art that any other term used to denote fuel efficiency may be used and computation may be made on kilometers, or any other distance, or liters, or any other liquid volume measurement. As such fuel mileage may be represented by units other then miles per gallons, such as kilometers per liter. In the example of FIG. 14A the fuel mileage is out of range. This may be due to many factors, such as that the charge for fuel was not entered for a specific fuel point. A driver may use a company fuel card to make fuel purchases. By using such a card, every fuel point will automatically be added to the system. It will to be recognized by those skilled in the art that there may be many fuel stops that may not accept such cards and the driver must pay for their fuel in cash or some other payment method, such as personal credit card. It is advantageous that the driver retains those cash receipts and makes an accounting for such to the company. A list of cash fuel receipts such as that depicted in FIG. 14B can then be used to add fuel points to the system.

Figure 14C:
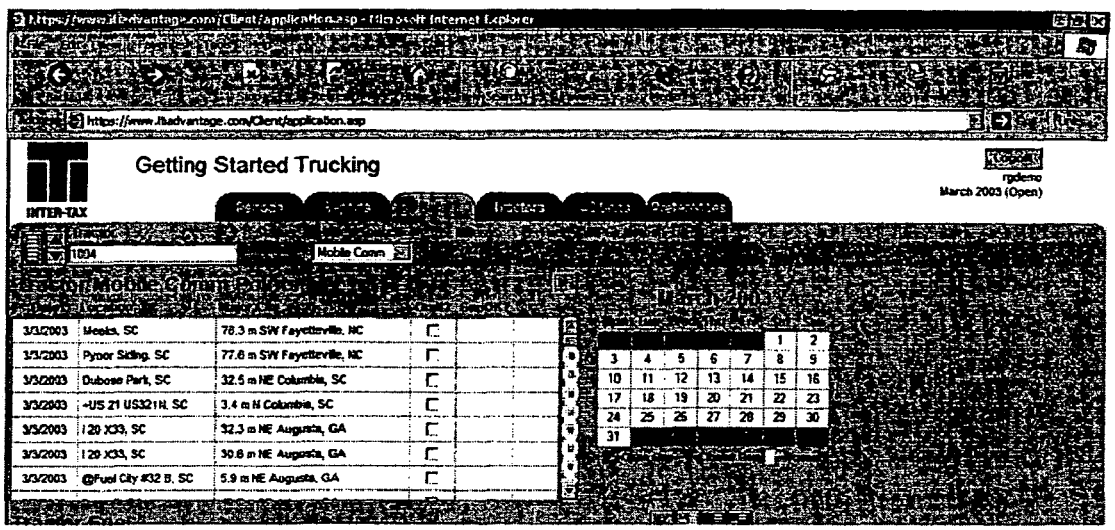

In the example of FIG. 14A is shown a screen where a user can add fuel points where the driver paid for their fuel with cash or other payment methods other then the company fuel card. By examining a cash fuel receipt log, such as that depicted in FIG. 14B the user of the system can add the cash fuel points. For each point where the company fuel card was not used, the user can choose to add data to the following entry areas, vendor name 1416, vendor city location 1417, vendor state location 1418, data of fueling 1419, quantity of fuel purchased 1420, liquid volume units 1421, price per unit 1422, currency purchased in 1423, and whether tax was paid on the purchase 1424. It is advantageous if the cash fuel receipt log contains all these items and the example depicted in FIG. 14B shows all those data items with the exception of the tax paid data item. In the first entry in the cash fuel receipt log example depicted in FIG. 14B, the vendor name is Flying J 1406, the location was Dandridge, Tenn. 1407, the fuel was purchased on Mar. 26, 2003 1409, 250 gallons of fuel were purchased 1410, and the unit cost was $1.58 per gallon 1411. The user will enter those data items into the UI 1300 for each fuel point where the driver needed to pay with some method other then the company fuel card. In FIG. 14C is depicted an example of the UI where all those fuel points have been entered for the tractor under consideration. The status has changed from Problem to Good as indicated at 1420. The user can now choose to perform actions for the next problem tractor by clicking or otherwise selecting the next button 1425.

Figure 14D:
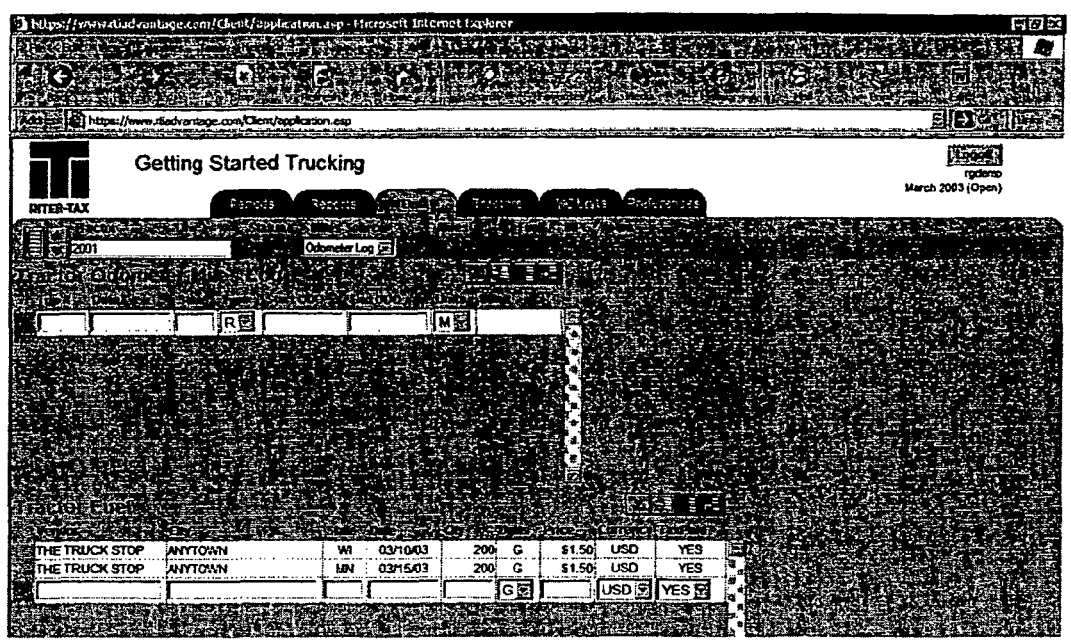

In an example, a tractor may lack a mobile communications device. This prevents the automatic uploading of location data into the system. It would be advantageous if the system would allow the user to enter information manually for such tractors. In FIG. 14D is shown an example of the UI 1300 where a tractor that lacks a mobile communications device is under consideration, tractor 2001. In an example, where a tractor lacks a mobile communications device, the Miles Source 1463 will default to an Odometer Log. In the example of FIG. 14D the user will examine a log, such as a driver log or a fueling log, to determine what the odometer readings were for fueling stops such as those shown in the Tractor Fuel screen portion 1466 of FIG. 14D. The user can then enter that data into the Tractor Odometer Miles Log screen portion 1467 of FIG. 14D. Once the fuel points are entered, the status, now displaying as Problem as indicated at 1462, will change to Good, and the next tractor can be examined.

Figure 14E:
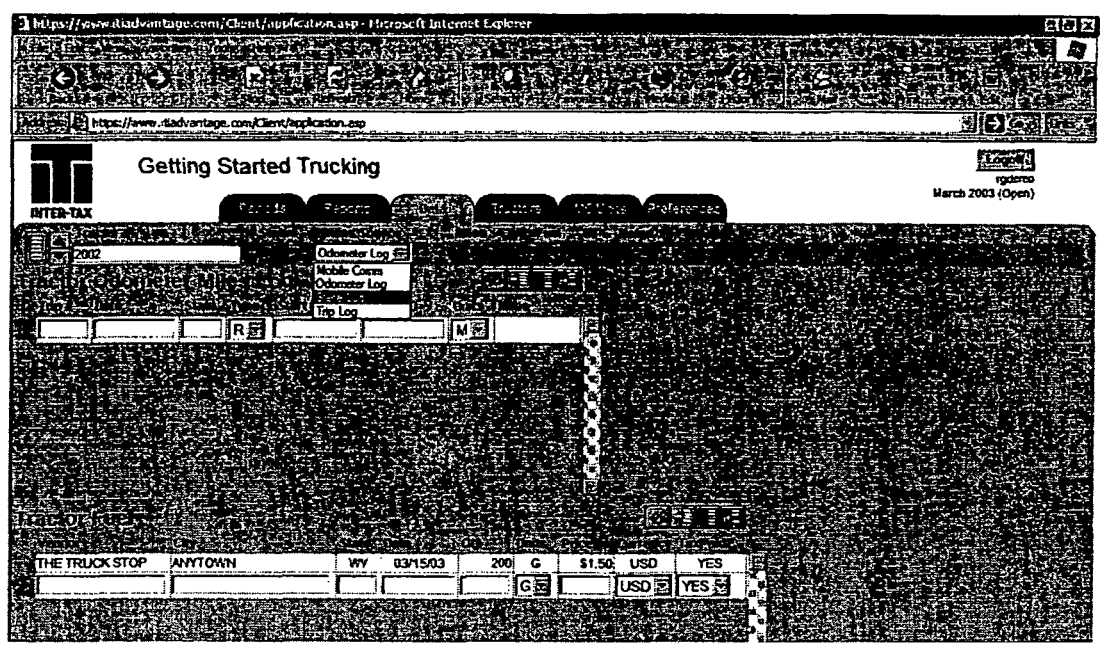

In an example, such as that depicted in FIG. 14E, there are other methods for adding data for tractors without mobile communications devices. The tractor under consideration in the example of FIG. 14E, tractor 2002, also lacks a mobile communications device. In this example, the user has chosen not to enter data for this tractor using the Odometer Log, but has chosen the State Log from the pulldown menu 1471. Using the State Log, the user will enter the miles driven for tractor 2002 in each of the states it has driven through during the time period under consideration. Once the miles have been entered, the status of this tractor, currently displayed as a Problem indicated at 1472, will change to Good. The user can then examine the next tractor with a Problem status.

Figure 14F:
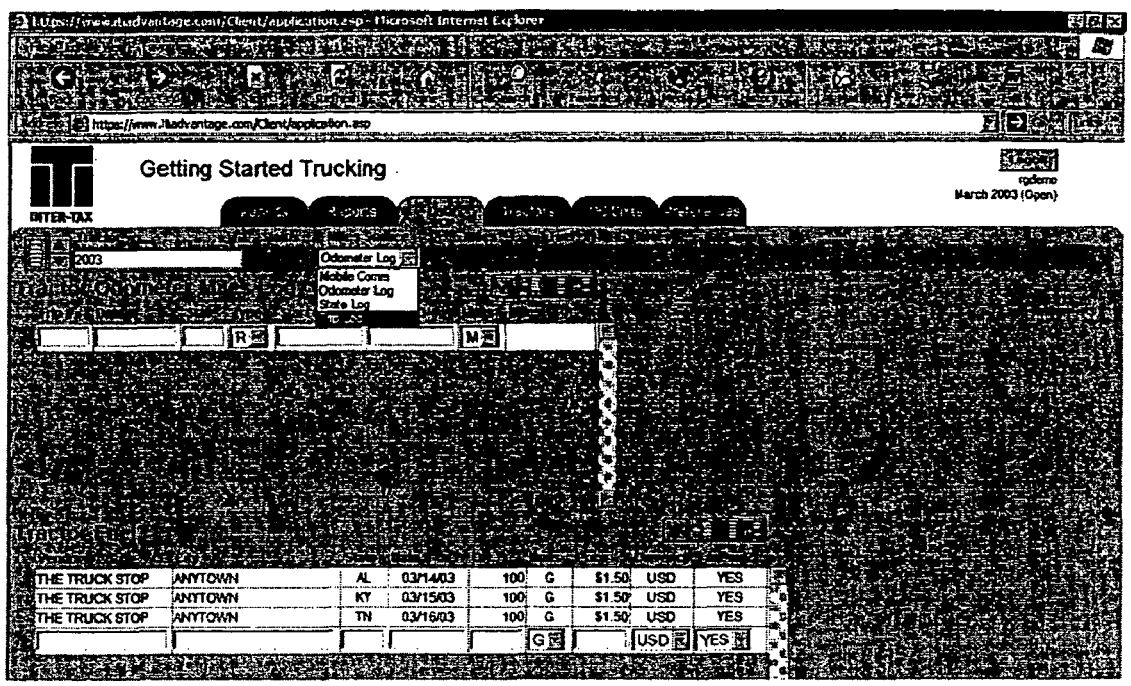

In an example, such as that depicted in FIG. 14F, there are other methods for adding data for tractors without mobile communications devices. The tractor under consideration in the example of FIG. 14F, tractor 2003, also lacks a mobile communications device. In this example, the user has chosen not to enter data for this tractor using the Odometer Log, but has chosen the Trip Log from the pulldown menu 1476. An example of a trip log is depicted in FIG. 14G. The user can enter information from the Trip Log into the system and change the status of tractor 2003 from Problem to Good.

In an example, when all the tractors with data problems have been investigated and corrected, the user can then choose to run reports for the month under investigation. The user can choose to run reports at any time. As will be recognized by those skilled in the art, running reports before a quarter is closed are preliminary and should not be submitted for tax accounting purposes. In an example, the system will print all reports prepared before a quarter is closed with a notation on them alerting the user to that. In an example, this notation is a 'Draft' indication.

Figure 15A:
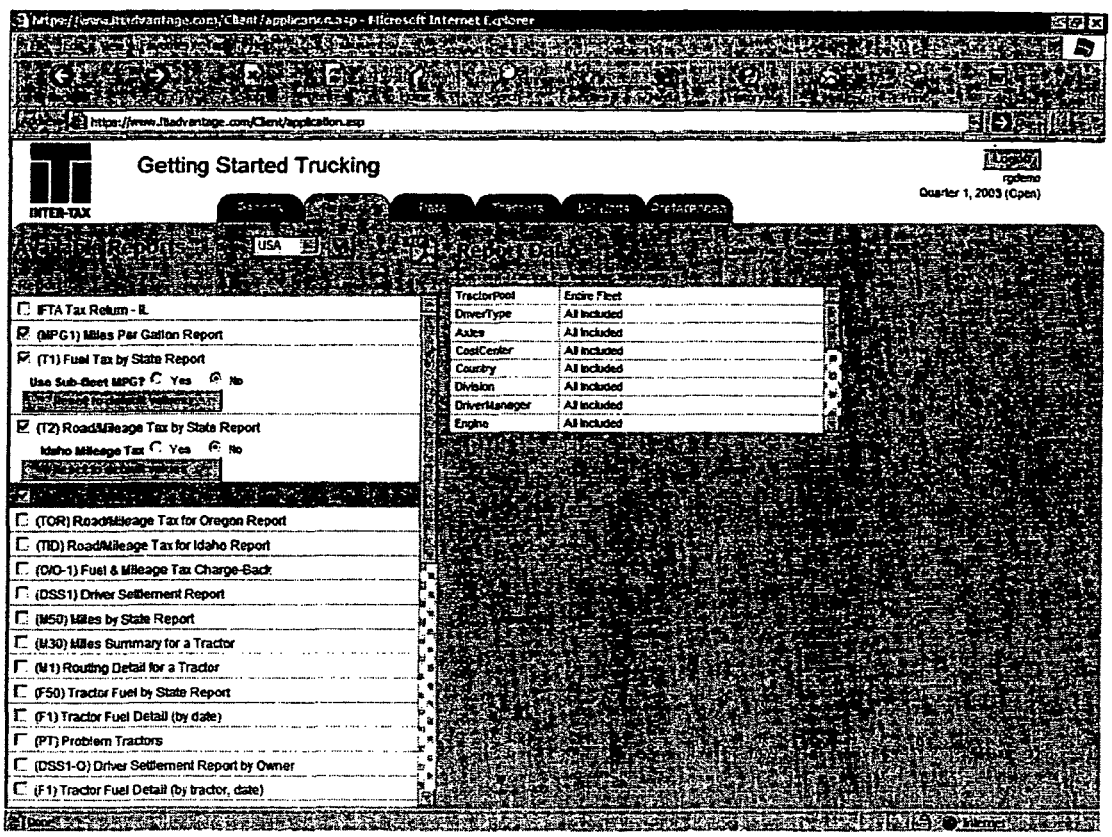
Figure 15B:
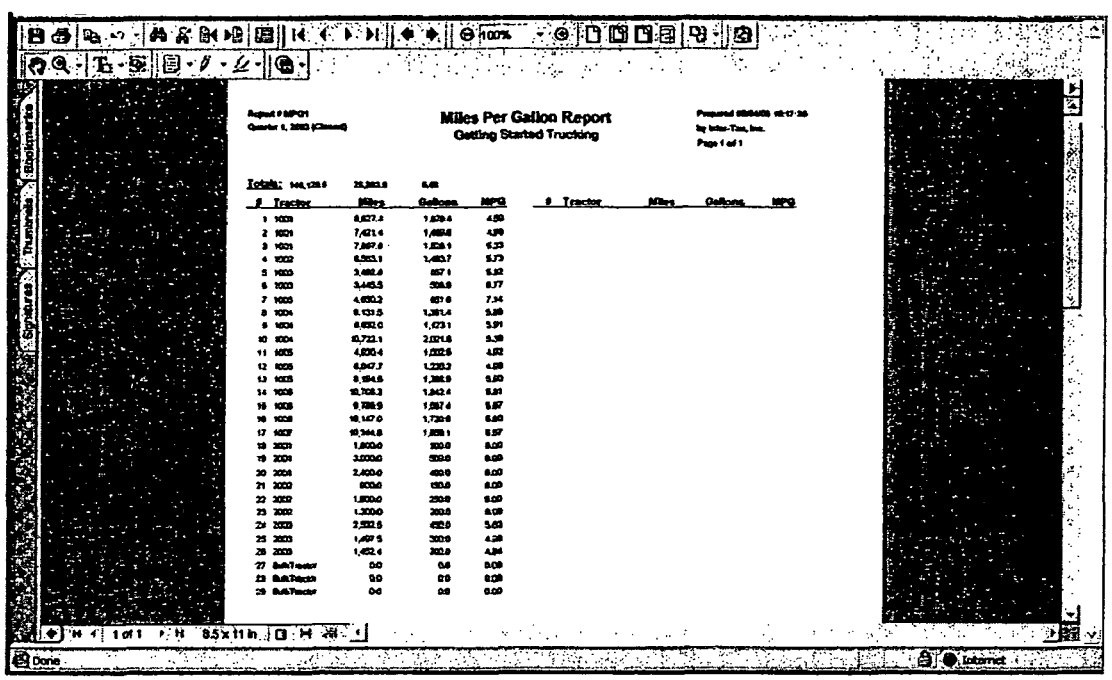
Figure 15C:
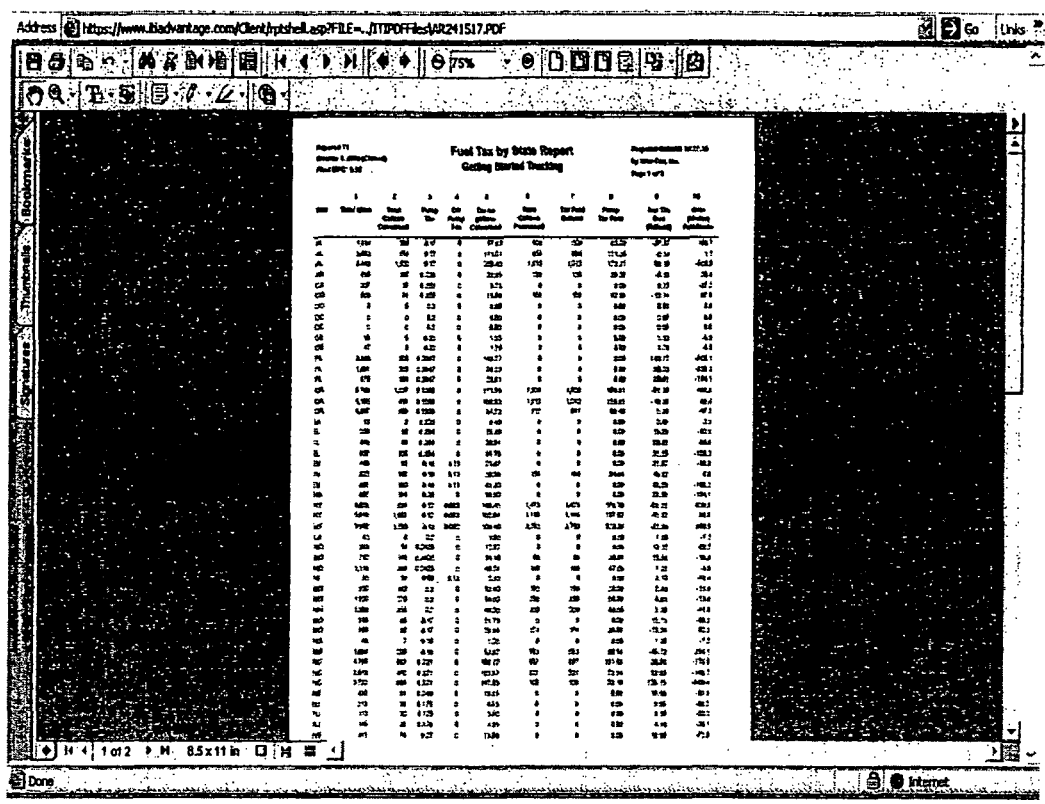
Figure 15D:
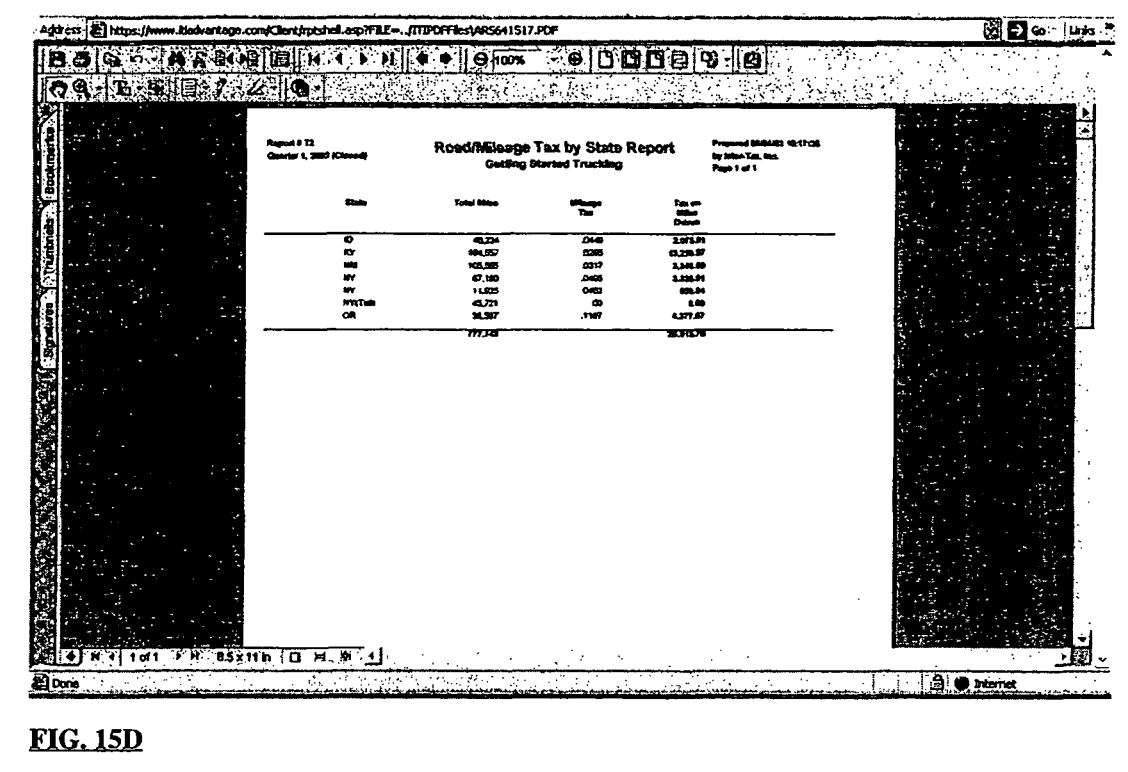

In an embodiment, the user can select to run reports from the UI 1300 by selecting the Reports tab on any screen, such as the Report Tab 1495 of FIF. 14F by selecting reports the user will be displayed a similar screen to that depicted in FIG. 15A. The user will be presented a selection of reports to be run. In an embodiment, multiple reports may be run concurrently. In the example of FIG. 15A, the user has chosen to run four reports as indicated by a checkmark such as the checkmark 1505 displayed alongside the MPG1 report. In an example, the user selects reports to be run by clicking or otherwise selecting the appropriate checkbox. In the example depicted in FIG. 15A, the user has selected the Miles Per Gallon Report, the Fuel Tax by State Report, the Road/Mileage Tax by State Report, and the Road/Mileage Tax for New York Report. It will be recognized by those skilled in the art that though a small selection of reports is shown in the example of FIG. 15A, any report that is useful for the purposes of tax accounting and reporting may be chosen by the user and that the list may contain those reports. In an example, the user can choose to print the reports in a portable document format, or pdf, for easy viewing on a computer display. The user can select to print such a format by clicking or otherwise selecting the icon as illustrated at 1510. It will be recognized by those skilled in the art that any format may be used to display and subsequently print the reports and that the mention of only the pdf format in no way limits the present invention to that format and the scope of the present invention should only be determined with reference to the appended claims.

In the examples of FIGS. 15B, 15C, 15D and 15E are shown example reports that a user can be displayed after selecting to print reports. These reports can be inspected on screen for completeness and the user can further choose to actually print them to paper as well.

It is to be understood that the above description is intended to be illustrative, and not restrictive. Many other embodiments will be apparent to those of skill in the art upon reading and understanding the above description. It should be noted that embodiments discussed in different portions of the description or referred to in different drawings can be combined to form additional embodiments of the present application. The scope of the invention should, therefore, be determined with reference to the appended claims, along with the full scope of equivalents to which such claims are entitled.

What is claimed is:

1. A method comprising:
   electronically processing vehicle location data wherein the vehicle location data specifies a sequence of vehicle locations, wherein the processing determines if the sequence of vehicle locations form a sequence of the vehicle's travel that is acceptable for the purposes of filing tax reports relating to the vehicle, wherein the acceptability of the sequence is determined according to one or more criteria;
   identifying a part of the sequence as potentially or actually unacceptable, based on one or more gaps in distance or periods of time between the vehicle location data;
   displaying to a user the identified potentially or actually unacceptable part of the sequence; and
   providing the user one or more graphical user interface tools that the user can employ to assess the unacceptable part of the sequence.

2. The method according to claim 1 wherein the one or more tools includes displaying a geographic map of the vehicle's location with the unacceptable portion indicated on the map.

3. The method according to claim 1 wherein the one or more tools includes displaying fuel record data or dispatch data to the user.

4. The method according to claim 1 wherein the one or more tools includes displaying odometer log data to the user.

5. The method according to claim 1 wherein the one or more tools includes displaying state log data to the user.

6. The method according to claim 1 further including providing the user one or more graphical user interface tools that enable the user to accept or revise the vehicle location data for the unacceptable part of the sequence.

7. The method according to claim 1 further including preparing tax information formatted for use in filing a tax return.

8. A method comprising:
   electronically processing digital vehicle location data specifying a sequence of vehicle locations;
   graphically displaying to a user a map showing the sequence of vehicle locations;
   highlighting on the map a part of the sequence that is questionable based on one or more gaps in distance or periods of time where digital vehicle location data is not available; and
   accepting input from the user to adjust the questionable part of the sequence.

9. The method according to claim 8 further including preparing tax information formatted for use in filing a tax return.

10. The method according to claim 8 wherein graphically displaying to a user a map further includes displaying on the map a predictively determined likely route.

11. A method comprising:
    electronically processing digital vehicle location data specifying a sequence of vehicle locations;
    identifying a part of the sequence as being questionable in accordance with one or more of a gap in distance between digital vehicle location data, a period of time between digital vehicle location data, or a computed vehicle fuel efficiency value being outside of a determined range of values;
    displaying to a user the identified part of the sequence that is questionable;
    offering the user one or more graphical user interface tools that can be used to analyze the questionable part of the sequence; and
    accepting input from the user to adjust the questionable part of the sequence.

12. The method according to claim 11 further including preparing tax information formatted for use in filing a tax return.

13. A method comprising:
    electronically processing digital vehicle location data specifying a sequence of vehicle locations defining a trip;
    displaying to a user a series of geographic points on the trip that describe the trip's path;
    highlighting to a user one or more of the geographic points as being of questionable accuracy or reliability; and
    accepting input from the user to adjust the questionable part of the sequence.

14. The method according to claim 13 further including preparing tax information formatted for use in filing a tax return.

15. The method according to claim 13 further including offering the user one or more graphical user interface tools that can be used to analyze the questionable part of the sequence.

16. An apparatus comprising:
    a computer programmed to electronically process vehicle location data wherein the vehicle location data specifies a sequence of vehicle locations, wherein the processing determines if the sequence of vehicle locations form a sequence of the vehicle's travel that is acceptable for the purposes of filing tax reports relating to the vehicle, wherein the acceptability of the sequence is determined in accordance with one or more of a gap in distance between vehicle location data, a period of time between vehicle location data, or a computed vehicle fuel efficiency value being outside of a determined range of values; and
    the computer further programmed to identify a part of the sequence as being potentially or actually unacceptable, display to a user the potentially or actually unacceptable part of the sequence and to provide to the user one or more graphical user interface tools that the user can employ to assess the unacceptable part of the sequence.

17. The apparatus according to claim 16 further wherein the computer is programmed to format information useful for filing tax returns.

18. The apparatus according to claim 16 wherein the one or more tools includes displaying a geographic map of the vehicle's location with the unacceptable portion indicated on the map.

19. The apparatus according to claim 16 wherein the one or more tools includes displaying fuel record data or dispatch data to the user.

20. The apparatus according to claim 16 further including providing the user one or more graphical user interface tools that enable the user to accept or revise the vehicle location data for the unacceptable part of the sequence.

21. An apparatus comprising a computer system including:
a first software component operable on the computer to electronically process digital vehicle location data specifying a sequence of vehicle locations, said first software component further operable to identify a part of the sequence that is questionable based on one or more gaps in distance or periods of time where digital vehicle location data is not available;
a second software component operable on the computer system to graphically display to a user a map showing the part of the sequence that is questionable; and
a third software component operable on the computer system to accept input from the user to adjust the questionable part of the sequence.

22. The apparatus according to claim 21 further wherein the computer system is programmed to format information useful for filing tax returns.

23. An apparatus comprising:
a storage device storing digital vehicle location data specifying a sequence of vehicle locations;
a display component that displays to a user a part of the sequence that is highlighted as questionable in accordance with one or more of a gap in distance between digital vehicle location data, a period of time between digital vehicle location data, or a computed vehicle fuel efficiency value being outside of a determined range of values;
a user interface component that offers the user one or more graphical user interface tools that can be used to analyze the questionable part of the sequence;
a user input component that receives data or command inputs from the user; and
a data adjustment component that uses data or command inputs from the user to adjust the questionable part of the sequence.

24. An apparatus according to claim 23 further including a tax return component to format information useful for filing tax returns.

25. An apparatus comprising:
a data storage unit that stores digital vehicle location data specifying a sequence of vehicle locations defining a trip;
graphical display software operable on a computer that generates a display of a series of geographic points on the trip that describe the trip's path;
the graphical display software further operable on the computer to highlight one or more of the geographic points as being of questionable accuracy or reliability; and
data input software operable on the computer to accept input from a user to adjust or accept the questionable part of the sequence.

26. An apparatus according to claim 25 further including tax return software operable on the computer to format information useful for filing tax returns.

27. An apparatus according to claim 25 further including the graphical display software operable on the computer to offer the user one or more graphical user interface tools that can be used to analyze the questionable part of the sequence.

28. An article of manufacture comprising a computer readable software program stored in a digital storage medium, wherein:
the software program includes software operable on a computer to generate a display of a series of geographic points on a vehicle's trip that describe the trip's path;
the software program includes software operable on the computer to highlight one or more of the geographic points as being of questionable accuracy or reliability; and
the software program includes software responsive to input data or commands to adjust or accept the questionable part of the sequence.

29. The article of manufacture according to claim 28 further wherein the software program includes software operable on the computer to offer the user one or more graphical user interface tools that can be used to analyze the questionable part of the sequence.

30. An apparatus comprising:
a server programmed to electronically process vehicle location data wherein the vehicle location data specifies a sequence of vehicle locations, wherein the processing determines if the sequence of vehicle locations form a sequence of the vehicle's travel that is acceptable for the purposes of filing tax reports relating to the vehicle, wherein the acceptability of the sequence is determined according to one or more of a gap in distance between digital vehicle location data, a period of time between digital vehicle location data, or a computed vehicle fuel efficiency value being outside of a determined range of values; and
the server further programmed to generate display commands or data used by a client computer to identify a part of the sequence as being potentially or actually unacceptable, to display the potentially or actually unacceptable part of the sequence and to provide to the user one or more graphical user interface tools that the user can employ to assess the unacceptable part of the sequence.

31. The apparatus according to claim 30 further including a tax return component operable on the server to format information useful for filing tax returns.

32. The apparatus according to claim 30 wherein the one or more tools includes displaying a geographic map of the vehicle's location with the unacceptable portion indicated on the map.

33. The apparatus according to claim 30 wherein the one or more tools includes displaying fuel record data or dispatch data to the user.

34. The apparatus according to claim 30 further including providing the user one more graphical user interface tools that enable the user to accept or revise the vehicle location data for the unacceptable part of the sequence.

35. An article of manufacture comprising a computer readable software program stored in a digital storage medium, wherein:
the software program includes software operable on a computer to generates display data or commands used by a client computer to display of a series of geographic points on a vehicle's trip that describe the trip's path;
the software program includes software operable on the computer to cause the client computer to highlight one or more of the geographic points that are determined to be of questionable accuracy or reliability; and
the software program includes software responsive to input data or commands from the client computer to adjust or accept the questionable part of the sequence.

36. The article of manufacture according to claim 35 wherein the software program further includes software operable on the computer to generate data or commands that cause the client computer to offer the user one or more graphical user interface tools that can be used to analyze the questionable part of the sequence.

37. The article of manufacture according to claim 35 wherein the software program further includes software operable on the computer to format information useful for filing tax returns.

* * * * *